(12) United States Patent
Sun et al.

(10) Patent No.: US 9,037,440 B2
(45) Date of Patent: May 19, 2015

(54) COMPUTER SIMULATION OF FLUID FLOW AND ACOUSTIC BEHAVIOR

(75) Inventors: Chenghai Sun, Salem, MA (US);
Franck Léon PéRot, San Francisco, CA (US); Raoyang Zhang, Burlington, MA (US); Hudong Chen, Newton, MA (US); David M. Freed, Brisbane, CA (US); Ilya Staroselsky, Lincoln, MA (US)

(73) Assignee: Exa Corporation, Burlington, MA (US)

( * ) Notice: Subject to any disclaimer, the term of this patent is extended or adjusted under 35 U.S.C. 154(b) by 157 days.

(21) Appl. No.: 13/292,844

(22) Filed: Nov. 9, 2011

(65) Prior Publication Data

US 2013/0116997 A1    May 9, 2013

(51) Int. Cl.
*G06F 17/50*    (2006.01)

(52) U.S. Cl.
CPC ........ *G06F 17/5018* (2013.01); *G06F 2217/16* (2013.01)

(58) Field of Classification Search
CPC . G06F 17/5018; G06F 2217/16; G06F 17/12; G06F 17/50; G06F 17/5009; G06F 17/5095
See application file for complete search history.

(56) References Cited

U.S. PATENT DOCUMENTS

| | | | | |
|---|---|---|---|---|
| 5,377,129 A | * | 12/1994 | Molvig et al. | 703/9 |
| 5,594,671 A | * | 1/1997 | Chen et al. | 703/6 |
| 2008/0126045 A1 | * | 5/2008 | Shan et al. | 703/9 |
| 2009/0164189 A1 | | 6/2009 | Bourbiaux | |
| 2010/0300968 A1 | * | 12/2010 | Liu et al. | 210/636 |

OTHER PUBLICATIONS

Li w., Wei X., Kaufman A., Implementing Lattice Boltzmann Computation on Graphics Hardware, The Visual Computer (2003) 19:444-456.*
Baily et al., Accelerating Lattice Boltzmann Fluid Flow Simulations Using Graphics Processors, International Conference on Parallel Processors, 2009, 550-557.*
Tolke J., Implementation of a Lattice Boltzmann Kernel using the Compute Unified Device Architecture developed by nVIDIA, Comput Visual Sci, 2007.*
Betello et al., Lattice Boltzmann Method on a cluster of IBM RISC System/6000 workstations, IEEE, 1992, 242-247.*
(Continued)

*Primary Examiner* — Kamini S Shah
*Assistant Examiner* — Scott S Cook
(74) *Attorney, Agent, or Firm* — Fish & Richardson P.C.

(57) ABSTRACT

A computer-implemented method for simulating flow and acoustic interaction of a fluid with a porous medium includes simulating activity of a fluid in a first volume adjoining a second occupied by a porous medium, the activity of the fluid in the first volume being simulated so as to model movement of elements within the first volume and using a first model having a first set of parameters, simulating activity of the fluid in the second volume occupied by the porous medium, the activity in the second volume being simulated so as to model movement of elements within the second volume and using a second model having a second set of parameters and differing from the first model in a way that accounts for flow and acoustic properties of the porous medium, and simulating movement of elements between the first volume and the second volume at an interface between the first volume and the second volume.

45 Claims, 15 Drawing Sheets

(56) References Cited

OTHER PUBLICATIONS

Huang et al., The phononic lattice solid by interpolation for modelling P waves in heterogeneous media, Geophys. J. Int. (1994), 766-778.*
Huang L., A Lattice Boltzmann Approach to Acoustic-Wave Propagation, Advances in Geophysics, 2007, vol. 48, 517-559.*
Sytze M. de Vries Propagation of Transient Acoustic Waves in Porous Media, Bibliotheek Technische Universiteit, 1989.*
Vallabh et al., New Approach for Determining Tortuosit in Fibrous Porous Media, Journal of Engineered Fibers and Fabrics, vol. 5, Issue 3—2010, 7-15.*
Priebsch et al., Numerical Simulation of Vehicle Interior Noise up to 250 Hz, Integrated Vehicle Acoustic and Comfort, 2001, 149-162.*
Guo Z., Lattice Boltzmann model for incompressible flows through porous media, Physical Review E 66, 036304 (2002).*
Toutant et al., Lattice Boltzmann simulations of impedance tube flow, computer & fluids 38 92009) 458-465.*
Haydock D., Yeomans, J.M., Lattice Boltzmann Simulations of Acoustic Streaming, J. Phys. A:Math. Gen. 34 (2001) 5201-5212.*
Aerodynamics:http://www.princeton.edu/~achaney/tmve/wiki100k/docs/Aerodynamics.html.*
Braile, L.W., Seismic Waves and the Slinky: A Guide for Teachers http://web.ics.purdue.edu/~braile/edumod/slinky/slinky.htm.*
Aaltosalmi, U., Fluid Flow in Porous Media with the Lattice-Boltzmann Method, Department of Physics University of Jyvaskyla, Mar. 2005.*
Winkler, K.W., Acoustic Velocity and Attenuation in Porous Rocks, American Geophysical Union, 1995.*
Burton, L.J., Sound Attenuation and Prediction of Porous Media Properties in Hybrid Ducts Utilizing Spatially Periodic Area Changes, Proceedings of NCAD2008 Jul. 28-30, 2008.*
Schladitz, K., Design of Acoustic Trim Based on Geometric Modeling and Flow Simulation for Non-woven, Computational Materials Science 38 (2006) 56-66.*
Venegas, R., Numerical Modelling of Sound Absorptive Properties of Double Porosity Granular Materials, COMSOL Conference 2010 Paris.*
Crouse (Fundamental Aeroacoustic Capabilities of the Lattice-Boltzmann Method, 12th AIAA/CEAS Aeroacoustics Conference 927th AIAA Aeroacoustics Conference, May 8-10, 2006, Cambridge, Massachusetts).*
Spaid (Lattice Boltzmann Methods for Modeling Microscale Flow in Fibrous Porous Media, Physics of Fluids (1994-present) 9, 2468 (1997) http://dx.doi.org/10.1063/1.869392.*
International Search Report & Written Opinion, PCT/US2012/61682, mailed Jan. 25, 2013, 6 pages.
Schladitz, Katja et al., "Design of acoustic trim based on geometric modeling and flow simulation for non-woven," Computational Materials Science 38 (2006) 56-66.

* cited by examiner

COMPUTER SIMULATION OF FLUID FLOW AND ACOUSTIC BEHAVIOR

TECHNICAL FIELD

This description relates to computer simulation of physical processes, such as fluid flow and acoustics.

BACKGROUND

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). Another approach replaces the differential equations with what is generally known as lattice gas (or cellular) automata, in which the macroscopic-level simulation provided by solving the Navier-Stokes equations is replaced by a microscopic-level model that performs operations on particles moving between sites on a lattice.

SUMMARY

In general, this document describes techniques for simulating interactions between a fluid and a porous medium at an interface between the fluid and the porous medium. These interactions may be simulated for the purpose of characterizing acoustic properties of a system including the fluid and the porous medium. The volume properties that permit accurate simulation of flow resistance also may be used to permit accurate simulation of acoustic resistance. As such, representing a porous medium with flow resistance properties and accurately modeling the interface between a fluid space and the porous medium may lead to accurate representations of the acoustic behavior of the porous medium (i.e., the porous medium's ability to attenuate sound). Accurate representation of the acoustic properties may permit improved simulation of physical phenomena such as the acoustic impedance or acoustic absorption of materials in complex systems such as vehicles and buildings.

In one general aspect, a computer-implemented method for simulating flow and acoustic interaction of a fluid with a porous medium includes simulating activity of a fluid in a first volume adjoining a second volume occupied by a porous medium. The activity of the fluid in the first volume is simulated so as to model movement of elements within the first volume and using a first model having a first set of parameters. In addition, activity of the fluid in the second volume occupied by the porous medium is simulated so as to model movement of elements within the second volume and using a second model having a second set of parameters and differing from the first model in a way that accounts for flow and acoustic properties of the porous medium. Finally, movement of elements between the first volume and the second volume at an interface between the first volume and the second volume is simulated.

Implementations may include one or more of the following features. For example, a computer-accessible memory may be used to store a first set of state vectors for voxels of the first volume and a second set of state vectors for voxels of the second volume, with each of the state vectors including entries that correspond to particular momentum states of possible momentum states at a corresponding voxel. Simulating activity of the fluid in the first volume may include performing first interaction operations on the first set of state vectors, the first interaction operations modeling flow interactions between elements of different momentum states according to the first model, and performing first move operations on the first set of state vectors to reflect movement of elements to new voxels in the first volume according to the first model. Simulating activity of the fluid in the second volume may include performing second interaction operations on the second set of state vectors, the second interaction operations modeling flow interactions between elements of different momentum states according to the second model, and performing second move operations on the second set of state vectors to reflect movement of elements to new voxels in the second volume according to the second model.

Simulating movement of elements between the first volume and the second volume at the interface between the first volume and the second volume may include simulating movement of elements between a region of the first volume at the interface and a region of the second volume at the interface. For example, simulating movement of elements between the first volume and the second volume at the interface between the first volume and the second volume may include simulating movement of elements between state vectors of the first set of state vectors for voxels in the first volume at the interface and state vectors of the second set of state vectors for voxels in the second volume at the interface.

Movement of elements from the first volume to the second volume may be governed by a first set of constraints and movement of elements from the second volume to the first volume may be governed by a second set of constraints that differs from the first set of constraints. The first set of constraints may permit a fraction of elements oriented to move from the first volume to the second volume to actually move from the first volume to the second volume, the fraction corresponding to a porosity of the porous medium being simulated, while the second set of constraints may permit all elements oriented to move from the second volume to the first volume to actually move from the second volume to the first volume. The second set of parameters of the second model may differ from the first set of parameters of the first model in a way that accounts for a porosity of the porous medium being simulated, or one or more of acoustic resistance, acoustic absorption, and acoustic impedance of the porous medium being simulated. The second set of parameters of the second model may also differ from the first set of parameters of the first model in a way that accounts for one or more of tortuosity, characteristic viscous length, thermal characteristic length, and thermal permeability of the porous medium being simulated.

The elements may include particle distributions or fluxes of hydrodynamic and thermodynamic properties such as mass fluxes, momentum fluxes, and energy fluxes. Additionally, the elements may include properties such as mass, density, momentum, pressure, velocity, temperature, and energy. Moreover, the elements may be associated with any fluid, flow, or thermodynamic related quantity although not exhaustively noted above or explicitly discussed below.

The first volume may include, for example, one or more of an interior cabin of a vehicle and an exterior of an aircraft, and the second volume may include static components and surfaces within the interior cabin of the vehicle. In a more particular example, the first volume may include regions surrounding an aircraft landing gear assembly of the exterior of the aircraft, and the second volume may include regions between individual components of the aircraft landing gear assembly.

In another general aspect, a computer-implemented method for simulating flow and acoustic interaction of a fluid with a porous medium includes simulating activity of a fluid in a first volume adjoining a second volume occupied by a porous medium, with the activity of the fluid in the first volume being simulated so as to model movement of elements within the first volume and using a first model having a first set of parameters; simulating activity of the fluid in the second volume occupied by the porous medium, with the activity in the second volume being simulated so as to model movement of elements within the second volume and using a second model having a second set of parameters and differing from the first model in a way that accounts for properties of the porous medium; and simulating movement of elements between the first volume and the second volume at an interface between the first volume and the second volume by simulating movement of elements between a region of the first volume at the interface and a region of the second volume at the interface. Movement of elements from the first volume to the second volume is governed by a first set of constraints and movement of elements from the second volume to the first volume is governed by a second set of constraints that differs from the first set of constraints. The first set of constraints permits a fraction of elements oriented to move from the first volume to the second volume to actually move from the first volume to the second volume, the fraction corresponding to a porosity of the porous medium being simulated.

Implementations may include one or more of the features noted above or discussed below.

In other general aspects, the methods and techniques noted above and described below are included in a system for simulating flow and acoustic interaction of a fluid with a porous medium and a computer-readable data storage medium storing computer-executable instructions that, when executed, simulate flow and acoustic interaction of a fluid with a porous medium.

The systems and techniques may be implemented using a lattice gas simulation that employs a Lattice Boltzmann formulation. The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a lookup table, which performs a permutation on the bits (e.g., transforming the 110000 to 001100). Particles are then moved to adjoining sites (e.g., the two particles moving along the Y axis would be moved to neighboring sites to the left and right along the Y axis).

In an enhanced system, the state vector at each lattice site includes many more bits (e.g., 54 bits for subsonic flow) to provide variation in particle energy and movement direction, and collision rules involving subsets of the full state vector are employed. In a further enhanced system, more than a single particle is permitted to exist in each momentum state at each lattice site, or voxel (these two terms are used interchangeably throughout this document). For example, in an eight-bit implementation, 0-255 particles could be moving in a particular direction at a particular voxel. The state vector, instead of being a set of bits, is a set of integers (e.g., a set of eight-bit bytes providing integers in the range of 0 to 255), each of which represents the number of particles in a given state.

In a further enhancement, Lattice Boltzmann Methods (LBM) use a mesoscopic representation of a fluid to simulate 3D unsteady compressible turbulent flow processes in complex geometries at a deeper level than possible with conventional computational fluid dynamics ("CFD") approaches. A brief overview of LBM method is provided below.

Boltzmann-Level Mesoscopic Representation

It is well known in statistical physics that fluid systems can be represented by kinetic equations on the so-called "mesoscopic" level. On this level, the detailed motion of individual particles need not be determined Instead, properties of a fluid are represented by the particle distribution functions defined using a single particle phase space, $f=f(x, v, t)$, where x is the spatial coordinate while v is the particle velocity coordinate. The typical hydrodynamic quantities, such as mass, density, fluid velocity and temperature, are simple moments of the particle distribution function. The dynamics of the particle distribution functions obeys a Boltzmann equation:

$$\partial_t f + v \nabla_x f + F(x,t) \nabla_v f = C\{f\}, \qquad \text{Eq. (1)}$$

where F(x,t) represents an external or self-consistently generated body-force at (x,t). The collision term C represents interactions of particles of various velocities and locations. It is important to stress that, without specifying a particular form for the collision term C, the above Boltzmann equation is applicable to all fluid systems, and not just to the well known situation of rarefied gases (as originally constructed by Boltzmann).

Generally speaking, C includes a complicated multi-dimensional integral of two-point correlation functions. For the purpose of forming a closed system with distribution functions f alone as well as for efficient computational purposes, one of the most convenient and physically consistent forms is the well-known BGK operator. The BGK operator is constructed according to the physical argument that, no matter what the details of the collisions, the distribution function approaches a well-defined local equilibrium given by $\{f^{eq}(x, v, t)\}$ via collisions:

$$C = -\frac{1}{\tau}(f - f^{eq}), \qquad \text{(Eq. 2)}$$

where the parameter τ represents a characteristic relaxation time to equilibrium via collisions. Dealing with particles (e.g., atoms or molecules) the relaxation time is typically taken as a constant. In a "hybrid" (hydro-kinetic) representation, this relaxation time is a function of hydrodynamic variables like rate of strain, turbulent kinetic energy and others. Thus, a turbulent flow may be represented as a gas of turbulence particles ("eddies") with the locally determined characteristic properties.

Numerical solution of the Boltzmann-BGK equation has several computational advantages over the solution of the Navier-Stokes equations. First, it may be immediately recognized that there are no complicated nonlinear terms or higher order spatial derivatives in the equation, and thus there is little issue concerning advection instability. At this level of description, the equation is local since there is no need to deal with pressure, which offers considerable advantages for algorithm parallelization. Another desirable feature of the linear advection operator, together with the fact that there is no diffusive operator with second order spatial derivatives, is its ease in realizing physical boundary conditions such as no-slip surface or slip-surface in a way that mimics how particles truly interact with solid surfaces in reality, rather than mathematical conditions for fluid partial differential equations ("PDEs"). One of the direct benefits is that there is no problem handling the movement of the interface on a solid surface, which helps to enable lattice-Boltzmann based simulation software to successfully simulate complex turbulent aerodynamics. In addition, certain physical properties from the boundary, such as finite roughness surfaces, can also be incorporated in the force . Furthermore, the BGK collision operator is purely local, while the calculation of the self-consistent body-force can be accomplished via near-neighbor information only. Consequently, computation of the Boltzmann-BGK equation can be effectively adapted for parallel processing.

Lattice Boltzmann Formulation

Solving the continuum Boltzmann equation represents a significant challenge in that it entails numerical evaluation of an integral-differential equation in position and velocity phase space. A great simplification took place when it was observed that not only the positions but the velocity phase space could be discretized, which resulted in an efficient numerical algorithm for solution of the Boltzmann equation. The hydrodynamic quantities can be written in terms of simple sums that at most depend on nearest neighbor information. Even though historically the formulation of the lattice Boltzmann equation was based on lattice gas models prescribing an evolution of particles on a discrete set of velocities $v(\in\{c_i, i=1, \ldots, b\})$, this equation can be systematically derived from the first principles as a discretization of the continuum Boltzmann equation. As a result, LBE does not suffer from the well-known problems associated with the lattice gas approach. Therefore, instead of dealing with the continuum distribution function in phase space, $f(x,v,t)$, it is only necessary to track a finite set of discrete distributions, $f_i(x, t)$ with the subscript labeling the discrete velocity indices. The key advantage of dealing with this kinetic equation instead of a macroscopic description is that the increased phase space of the system is offset by the locality of the problem.

Due to symmetry considerations, the set of velocity values are selected in such a way that they form certain lattice structures when spanned in the configuration space. The dynamics of such discrete systems obeys the LBE having the form $ff_i(x+c_i,t+1)-f_i(x,t)=C_i(x,t)$, where the collision operator usually takes the BGK form as described above. By proper choices of the equilibrium distribution forms, it can be theoretically shown that the lattice Boltzmann equation gives rise to correct hydrodynamics and thermo-hydrodynamics. That is, the hydrodynamic moments derived from $f_i(x,t)$ obey the Navier-Stokes equations in the macroscopic limit. These moments are defined as:

$$\rho(x, t) = \sum_i f_i(x, t); \rho u(x, t) = \sum_i c_i f_i(x, t); \quad \text{Eq. (3)}$$

$$DT(x, t) = \sum_i (c_i - u)^2 f_i(x, t),$$

where ρ, u, and T are, respectively, the fluid density, velocity and temperature, and D is the dimension of the discretized velocity space (not at all equal to the physical space dimension).

Other features and advantages will be apparent from the following description, including the drawings, and the claims.

DESCRIPTION

Figure 1:
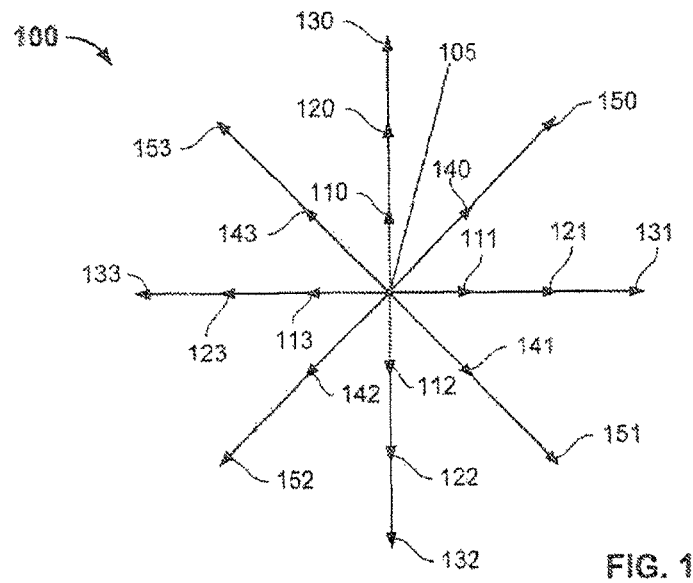
FIGS. 1 and 2 illustrate velocity components of two LBM models.

A. Volumetric Approach to Modeling Acoustic Absorption

Acoustic absorption, i.e., acoustic resistance, acoustic impedance, etc., by porous materials is an important topic in acoustics engineering. At a microscopic scale, the propagation of sound in porous media is difficult to characterize because of the topological complexity of the materials. At a macroscopic scale, porous materials with high porosity can be treated as regions of fluid which have modified properties relative to air. Sound propagation in such media can be expressed in the form of two intrinsic, frequency-dependent, and volumetric properties of the material: the characteristic impedance and the complex acoustic wave number. These properties may be modeled in different ways. For example, under certain assumptions, a given volumetric model for sound propagation in an absorbing material can be put in the form of a locally-reacting, frequency-dependent, complex impedance at the interface between two different media. Such impedance models may be used in approaches such as the Boundary Element Methods (BEM), the Finite Elements Methods (FEM), and the Statistical Energy Analysis (SEA) methods, and may be implemented as boundary conditions in the frequency domain.

For problems involving flow-induced noise, suitable Computational Fluid Dynamics (CFD) and/or Computational AeroAcoustics (CAA) numerical methods are non-linear and often time-explicit. For a time-explicit solution, time-domain surface impedance boundary conditions may allow modeling of acoustic absorption due to porous materials. However, even when a time-domain surface impedance formulation can be derived, stability and robustness may be challenging problems to overcome.

Another approach, which is described in more detail below, includes modeling of absorbing materials as volumetric fluid regions, such that sound waves travel through the material and dissipate via a momentum sink. This is analogous to the method for macroscopic modeling of flow through porous media achieved by relating the momentum sink to the flow resistance of the material following Darcy's law. For acoustic absorption modeling, there is the question of how to determine the momentum sink to achieve a desired absorption behavior. If the acoustic absorption is governed (or at least dominated) by the same physical mechanisms as the flow resistivity, then the same momentum sink behavior used to achieve the correct flow resistivity for a particular porous material should also achieve the correct acoustic absorption for that material. This approach may be applicable for any passive and homogeneous porous material. Moreover, the approach eliminates numerical stability problems since the impedance is realized in a way that satisfies passive, causal, and real conditions.

This volumetric modeling approach may be used in conjunction with a time-explicit CFD/CAA solution method based on the Lattice Boltzmann Method (LBM), such as the PowerFLOW system available from Exa Corporation of Burlington, Mass. Unlike methods based on discretizing the macroscopic continuum equations, LBM starts from a "mesoscopic" Boltzmann kinetic equation to predict macroscopic fluid dynamics. The resulting compressible and unsteady solution method may be used for predicting a variety of complex flow physics, such as aeroacoustics and pure acoustics problems. A porous media model is used to represent the flow resistivity of various components, such as air filters, radiators, heat exchangers, evaporators, and other components, which are encountered in simulating flow, such as through HVAC systems, vehicle engine compartments, and other applications.

A general discussion of a LBM-based simulation system is provided below and followed by a discussion of a volumetric modeling approach for acoustic absorption and other phenomena and a porous media interface model that may be used to support such a volumetric modeling approach.

B. Model Simulation Space

In a LBM-based physical process simulation system, fluid flow may be represented by the distribution function values $f_i$, evaluated at a set of discrete velocities $c_i$. The dynamics of the distribution function is governed by Equation 4 where $f_i(0)$ is known as the equilibrium distribution function, defined as:

$$f_\alpha^{(0)} = w_\alpha \rho \left[ 1 + u_\alpha + \frac{u_\alpha^2 - u^2}{2} + \frac{u_\alpha(u_\alpha^2 - 3u^2)}{6} \right] \quad \text{Eq. (4)}$$

This equation is the well-known lattice Boltzmann equation that describe the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision factor," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass $\rho$ and fluid velocity u, are obtained as simple summations in Equation (3). Here, the collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Referring to FIG. 1, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 2:
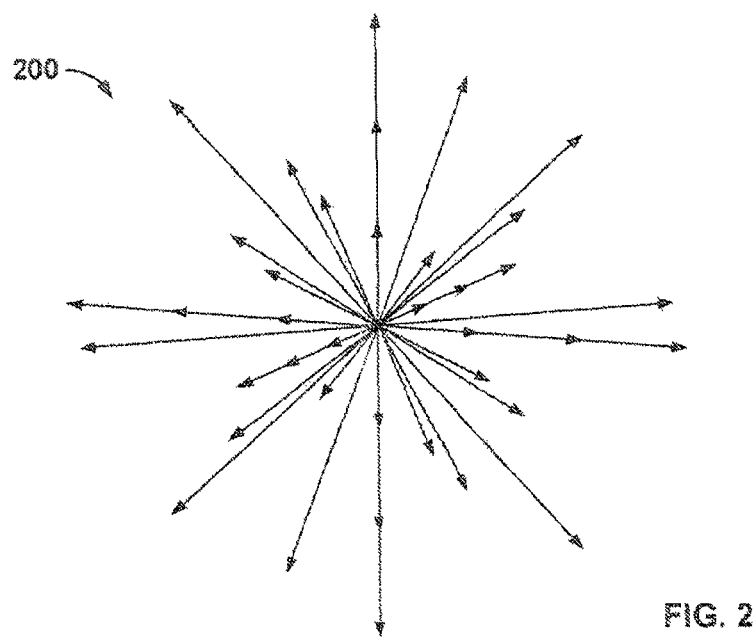

As also illustrated in FIG. 2, a second model (3D-1) 200 is a three-dimensional model that includes 39 velocities, where each velocity is represented by one of the arrowheads of FIG. 2. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used. The velocities are more clearly described by their component along each axis as documented in Tables 1 and 2 respectively.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two-and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 3:
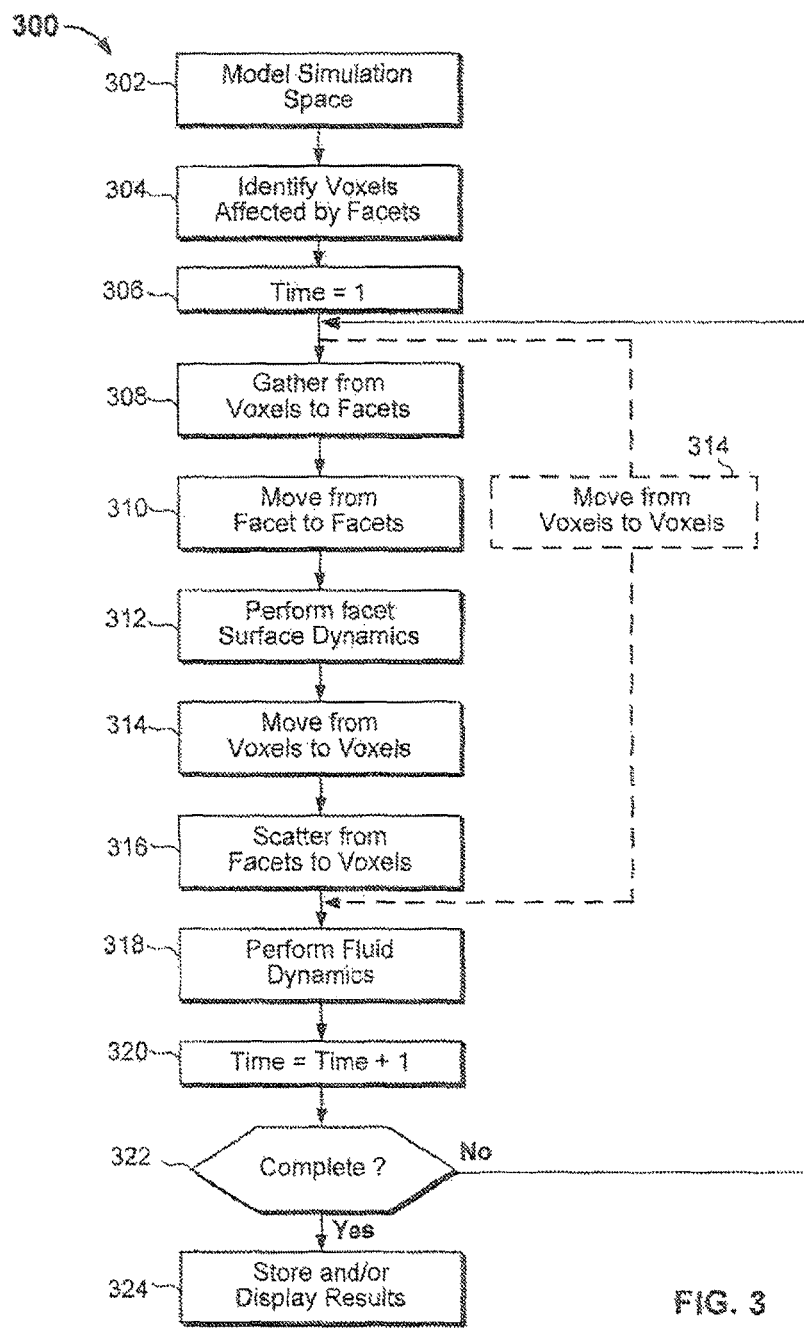
FIG. 3 is a flow chart of a procedure followed by a physical process simulation system.

Referring to FIG. 3, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw an micro-device positioned in a wind tunnel Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v.$$ Eq. (5)

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x, t)$, where f represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{i,x}, c_{i,y}, c_{i,z})$$ Eq. (6)

The energy level zero state represents stopped particles that are not moving in any dimension, i.e. $c_{stopped} = (0, 0, 0)$. Energy level one states represent particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

Figure 4:
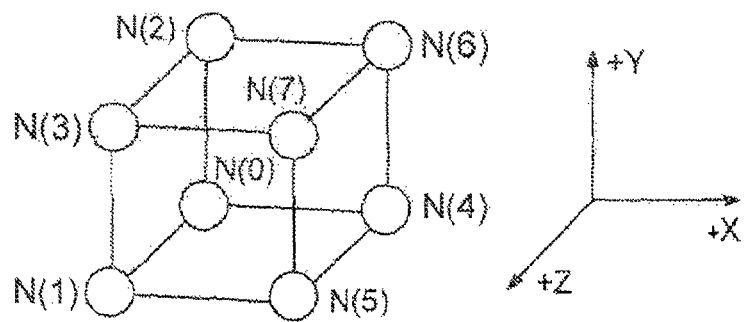
FIG. 4 is a perspective view of a microblock.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0,1,2,\ldots,7\}$. A microblock is illustrated in FIG. 4.

Figure 5A:
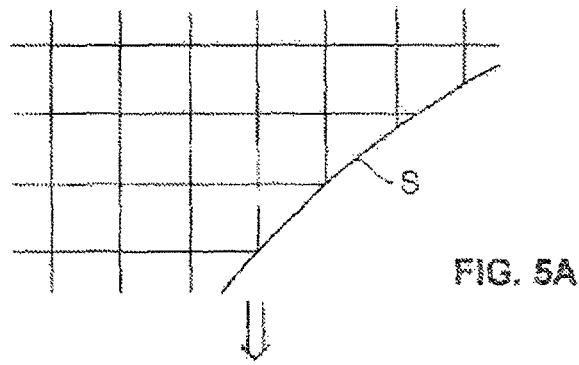
FIGS. 5A and 5B are illustrations of lattice structures used by the system of FIG. 3.
Figure 5B:
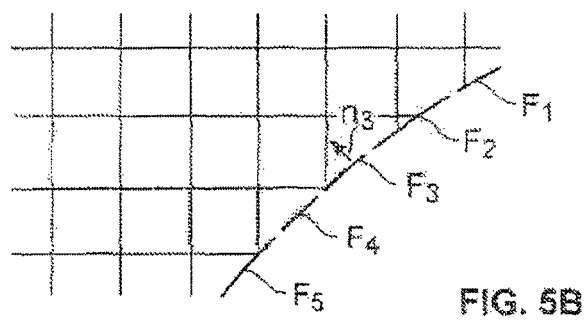

Referring to FIGS. 5A and 5B, a surface S (FIG. 3A) is represented in the simulation space (FIG. 5B) as a collection of facets $F_\alpha$:

$$S = \{F_\alpha\}$$ Eq. (7)

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 6:
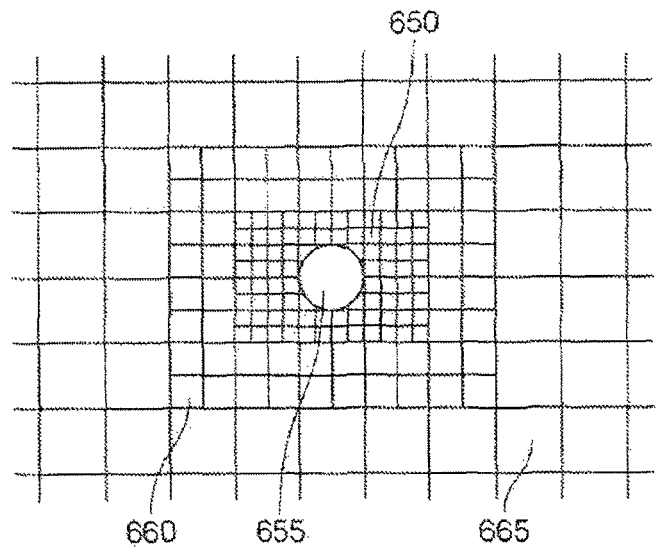
FIGS. 6 and 7 illustrate variable resolution techniques.
Figure 7:
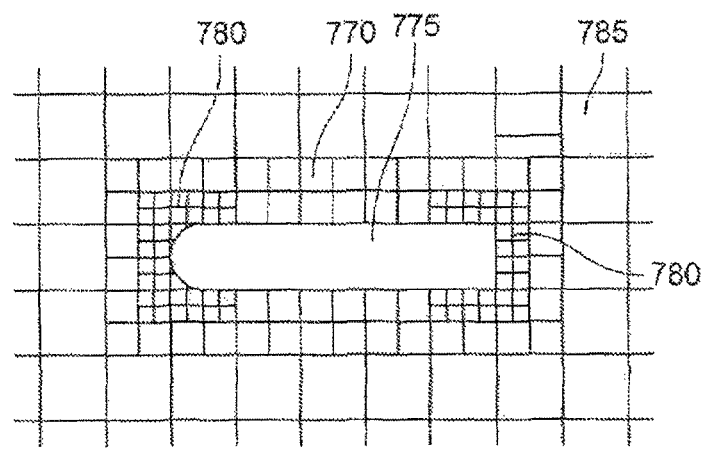

Referring to FIG. 6, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 7, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

C. Identify Voxels Affected By Facets

Referring again to FIG. 3, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 8:
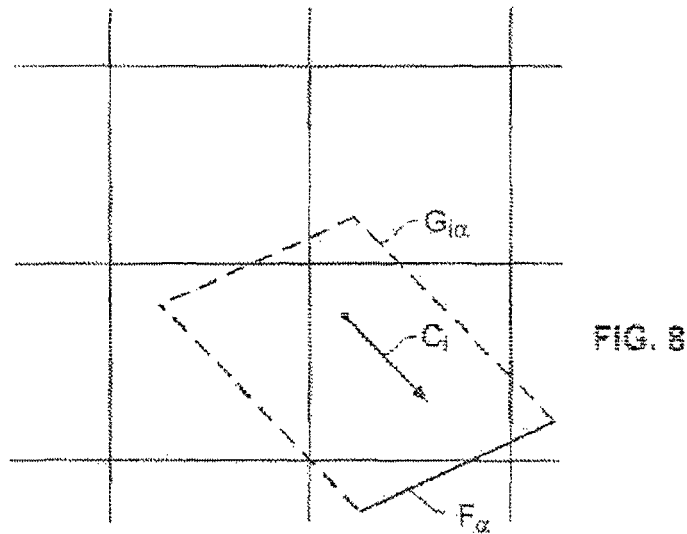
FIG. 8 illustrates regions affected by a facet of a surface.

Referring to FIG. 8, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_\alpha|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha \qquad \text{Eq. (8)}$$

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x). \qquad \text{Eq. (9)}$$

When the parallelepiped $G_{i\alpha}$ is intersected by one or more facets, the following condition is true:

$$V_{i\alpha} = \Sigma V_\alpha(x) + \Sigma V_{i\alpha}(\beta) \qquad \text{Eq. (10)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \qquad \text{Eq. (11)}$$

D. Perform Simulation

Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions For Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal n, of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather From Voxels to Facets

As a first step in simulating interaction between particles and a surface, particles are gathered from the voxels and provided to the facets (step 308). As noted above, the flux of state i particles between a voxel N(x) and a facet $F_\alpha$ is:

$$\Gamma_{i\alpha}(x) = N_i(x) V_{i\alpha}(x). \qquad \text{Eq. (12)}$$

From this, for each state i directed toward a facet $F_\alpha$ ($c_i n_\alpha < 0$), the number of particles provided to the facet $F_\alpha$ by the voxels is:

$$\Gamma_{i\alpha V \to F} = \sum_x \Gamma_{i\alpha}(x) = \sum_x N_i(x) V_{i\alpha}(x) \qquad \text{Eq. (13)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move From Facet to Facet

Figure 10:
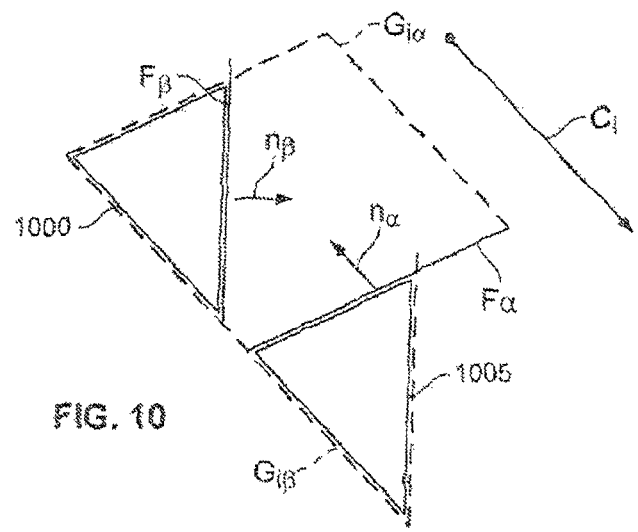
FIG. 10 illustrates movement of particles from a surface to a surface.

Next, particles are moved between facets (step 310). If the parallelepiped $G_{i\alpha}$ for an incoming state ($c_i n_\alpha < 0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 10, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_{62}$ and a facet $F_\alpha$ may be described as:

$$\Gamma_{i\alpha}(\beta, t-1) = \Gamma_i(\beta) V_{i\alpha}(\beta)/V_{i\alpha}, \quad \text{Eq. (14)}$$

where $\Gamma_i(\beta, t-1)$ is a measure of the state i particles produced by the facet $F_\beta$ during the previous time increment. From this, for each state i directed toward a facet $F_\alpha$ ($c_i n_\alpha < 0$), the number of particles provided to the facet $F_\alpha$ by the other facets is:

$$\Gamma_{i\alpha F\to F} = \sum_\beta \Gamma_{i\alpha}(\beta) = \sum_\beta \Gamma_i(\beta, t-1) V_{i\alpha}(\beta)/V_{i\alpha} \quad \text{Eq. (15)}$$

and the total flux of state i particles into the facet is:

$$\Gamma_{iIN}(\alpha) = \quad \text{Eq. (16)}$$
$$\Gamma_{i\alpha V\to F} + \Gamma_{i\alpha F\to F} = \sum_x N_i(x) V_{i\alpha}(x) + \sum_\beta \Gamma_i(\beta, t-1) V_{i\alpha}(\beta)/V_{i\alpha}$$

The state vector $N(\alpha)$ for the facet, also referred to as a facet distribution function, has 54 entries corresponding to the 54 entries of the voxel state vectors. The input states of the facet distribution function $N(\alpha)$ are set equal to the flux of particles into those states divided by the volume $V_{i\alpha}$:

$$N_i(\alpha) = \Gamma_{iIN}(\alpha)/V_{i\alpha}, \quad \text{Eq. (17)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha)/V \quad \text{Eq. (18)}$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \quad \text{Eq. (19)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 11:
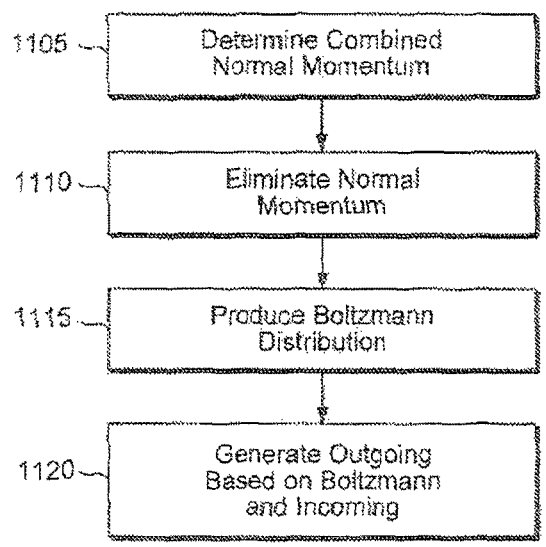
FIG. 11 is a flow chart of a procedure for performing surface dynamics.

Next, surface dynamics are performed for each facet to satisfy the four boundary conditions discussed above (step 312). A procedure for performing surface dynamics for a facet is illustrated in FIG. 11. Initially, the combined momentum normal to the facet $F_\alpha$ is determined (step 1105) by determining the combined momentum $P(\alpha)$ of the particles at the facet as:

$$P(\alpha) = \sum_i c_i * N_i^\alpha \quad \text{Eq. (20)}$$

for all i. From this, the normal momentum $P_n(\alpha)$ is determined as:

$$P_n(\alpha) = n_\alpha \cdot P(\alpha). \quad \text{Eq. (21)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is then determined (step 1120) based on the incoming flux distribution and the Boltzmann distribution. First, the difference between the incoming flux distribution $\Gamma_i(\alpha)$ and the Boltzmann distribution is determined as:

$$\Delta\Gamma_i(\alpha) = \Gamma_{iIN}(\alpha) - N_{n-\beta i}(\alpha) V_{i\alpha}. \quad \text{Eq. (22)}$$

Using this difference, the outgoing flux distribution is:

$$\Gamma_{iOUT}(\alpha) = N_{n-\beta i}(\alpha) V_{i\alpha} - \Delta\Gamma_{i*}(\alpha), \quad \text{Eq. (23)}$$

for $n_\alpha c_i > 0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\Gamma_{iOUT}(\alpha) = N_{n-Bi}(\alpha) V_{i\alpha} - \Delta\Gamma_{i*}(\alpha) + C_f(n_\alpha \cdot c_i)[N_{n-Bi*}(\alpha) - N_{n-Bi}(\alpha)] V_{i\alpha} + (n_\alpha \cdot c_i)(t_{1\alpha} \cdot c_i) \Delta N_{j,1} V_{i\alpha} + (n_\alpha \cdot c_i)(t_{2\alpha} \cdot c_i) \Delta N_{j,2} V_{i\alpha} \quad \text{Eq. (24)}$$

for $n_\alpha c_i > 0$, where $C_f$ is a function of skin friction, $t_{i\alpha}$ is a first tangential vector that is perpendicular to $n_\alpha$, $t_{2\alpha}$ is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}\left(n_\alpha \cdot \sum_i c_i c_i N_{n-Bi}(\alpha) \cdot t_{1,2\alpha}\right) \quad \text{Eq. (25)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha)n_\alpha)/\rho, \qquad \text{Eq. (26)}$$

where $\rho$ is the density of the facet distribution:

$$\rho = \sum_i N_i(\alpha) \qquad \text{Eq. (27)}$$

As before, the difference between the incoming flux distribution and the Boltzmann distribution is determined as:

$$\Delta \Gamma_i(\alpha) = \Gamma_{iIN}(\alpha) - N_{n-\beta i}(\alpha) V_{i\alpha}. \qquad \text{Eq. (28)}$$

The outgoing flux distribution then becomes:

$$\Gamma_{iOUT}(\alpha) = N_{n-\beta i}(\alpha) V_{i\alpha} - \Delta \Gamma_{i^*}(\alpha) + C_f(n_\alpha c_i)[N_{n-\beta i^*}(\alpha) - N_{n-\beta i}(\alpha)] V_{i\alpha}, \qquad \text{Eq. (29)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i, c_i \cdot n_\alpha > 0} c_i \Gamma_{i\alpha OUT} - \sum_{i, c_i \cdot n_\alpha < 0} c_i \Gamma_{i\alpha IN} = p_\alpha n_\alpha A_\alpha - C_f p_\alpha u_\alpha A_\alpha \qquad \text{Eq. (30)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta \Gamma_{\alpha mj} = \sum_{i, c_{ji} \cdot n_\alpha < 0} \Gamma_{\alpha jiIN} - \sum_{i, c_{ji} \cdot n_\alpha > 0} \Gamma_{\alpha jiOUT} \qquad \text{Eq. (31)}$$

where the index j denotes the energy of the state i. This energy difference is then used to generate a difference term:

$$\delta \Gamma_{\alpha ji} = V_{i\alpha} \Delta \Gamma_{\alpha mj} \bigg/ \sum_{i, c_{ji} \cdot n_\alpha < 0} V_{i\alpha} \qquad \text{Eq. (32)}$$

for $c_{ji} n_\alpha > 0$. This difference term is used to modify the outgoing flux so that the flux becomes:

$$\Gamma_{\alpha jiOUTf} = \Gamma_{\alpha jiOUT} + \delta \Gamma_{\alpha ji} \qquad \text{Eq. (33)}$$

for $c_{ji} n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move From Voxels to Voxels

Referring again to FIG. 3, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

Figure 9:
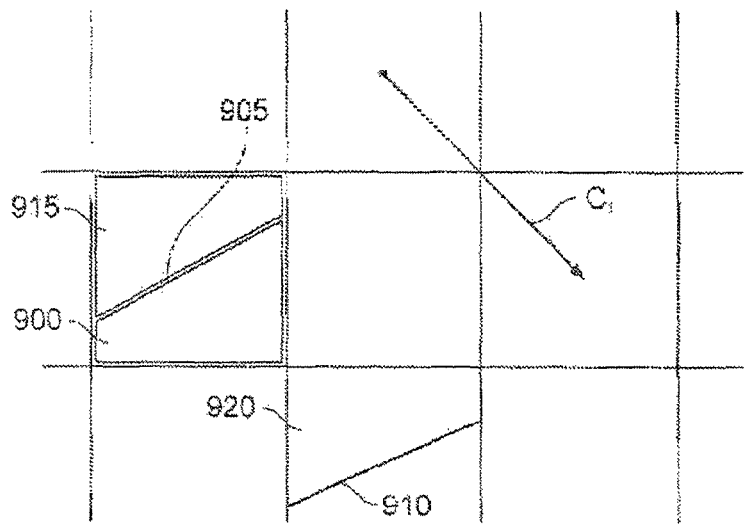
FIG. 9 illustrates movement of particles from a voxel to a surface.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet. For example, referring to FIG. 9, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)\left(1 - \sum_\alpha V_{i\alpha}(x)\right) \qquad \text{Eq. (34)}$$

where N(x) is the source voxel.

6. Scatter From Facets to Voxels

Next, the outgoing particles from each facet are scattered to the voxels (step 316). Essentially, this step is the reverse of the gather step by which particles were moved from the voxels to the facets. The number of state i particles that move from a facet $F_\alpha$ to a voxel N(x) is:

$$N_{\alpha i F \to V} = \frac{1}{P_f(x)} V_{\alpha i}(x) \Gamma_{\alpha i OUTf} / V_{\alpha i} \qquad \text{Eq. (35)}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x) \Gamma_{\alpha i OUT_f} / V_{\alpha i} \qquad \text{Eq. (36)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Finally, fluid dynamics are performed (step 318). This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

E. Variable Resolution

Figure 12:
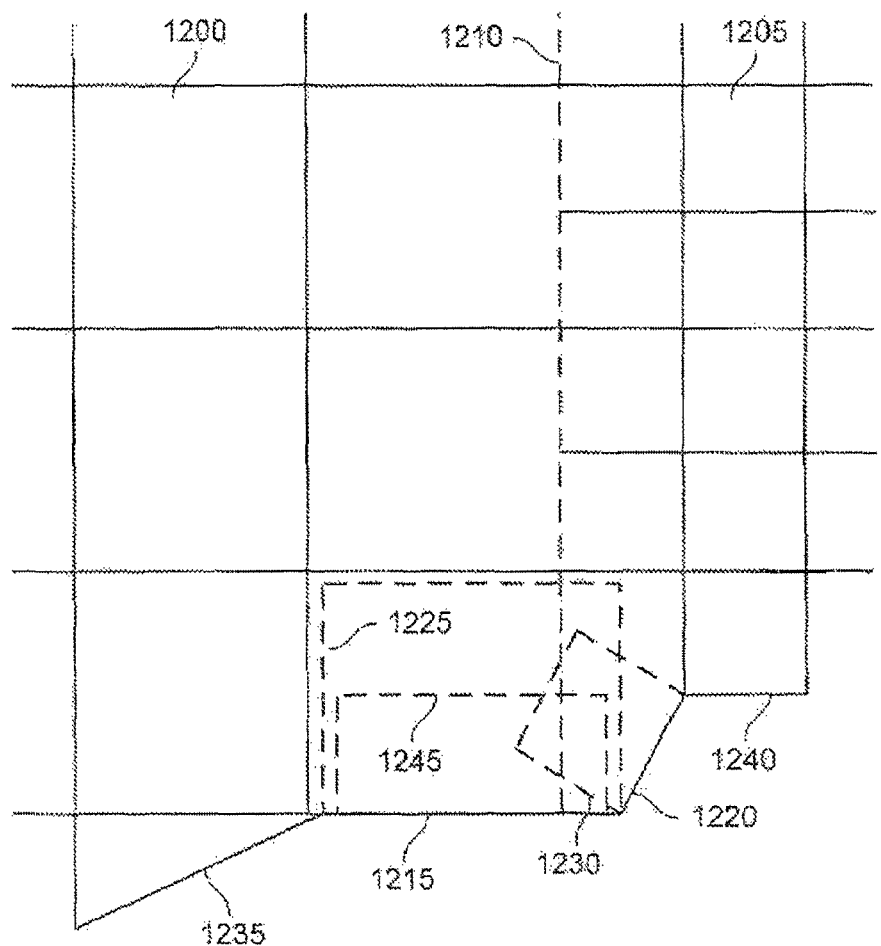
FIG. 12 illustrates an interface between voxels of different sizes.

Referring to FIG. 12, variable resolution (as illustrated in FIGS. 6 and 7 and discussed above) employs voxels of different sizes, hereinafter referred to as coarse voxels 12000 and fine voxels 1205. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1210.

When variable resolution is employed at or near a surface, facets may interact with voxels on both sides of the VR interface. These facets are classified as VR interface facets 1215 ($F_{\alpha IC}$) or VR fine facets 1220 ($F_{\alpha IF}$). A VR interface facet 1215 is a facet positioned on the coarse side of the VR interface and having a coarse parallelepiped 1225 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1220 is a facet positioned on the fine side of the VR interface and having a fine parallelepiped 1230 extending into a coarse voxel. Processing related to interface facets may also involve interactions with coarse facets 1235 ($F_{\alpha C}$) and fine facets 1240 ($F_{\alpha F}$).

For both types of VR facets, surface dynamics are performed at the fine scale, and operate as described above. However, VR facets differ from other facets with respect to the way in which particles advect to and from the VR facets.

Figure 13:
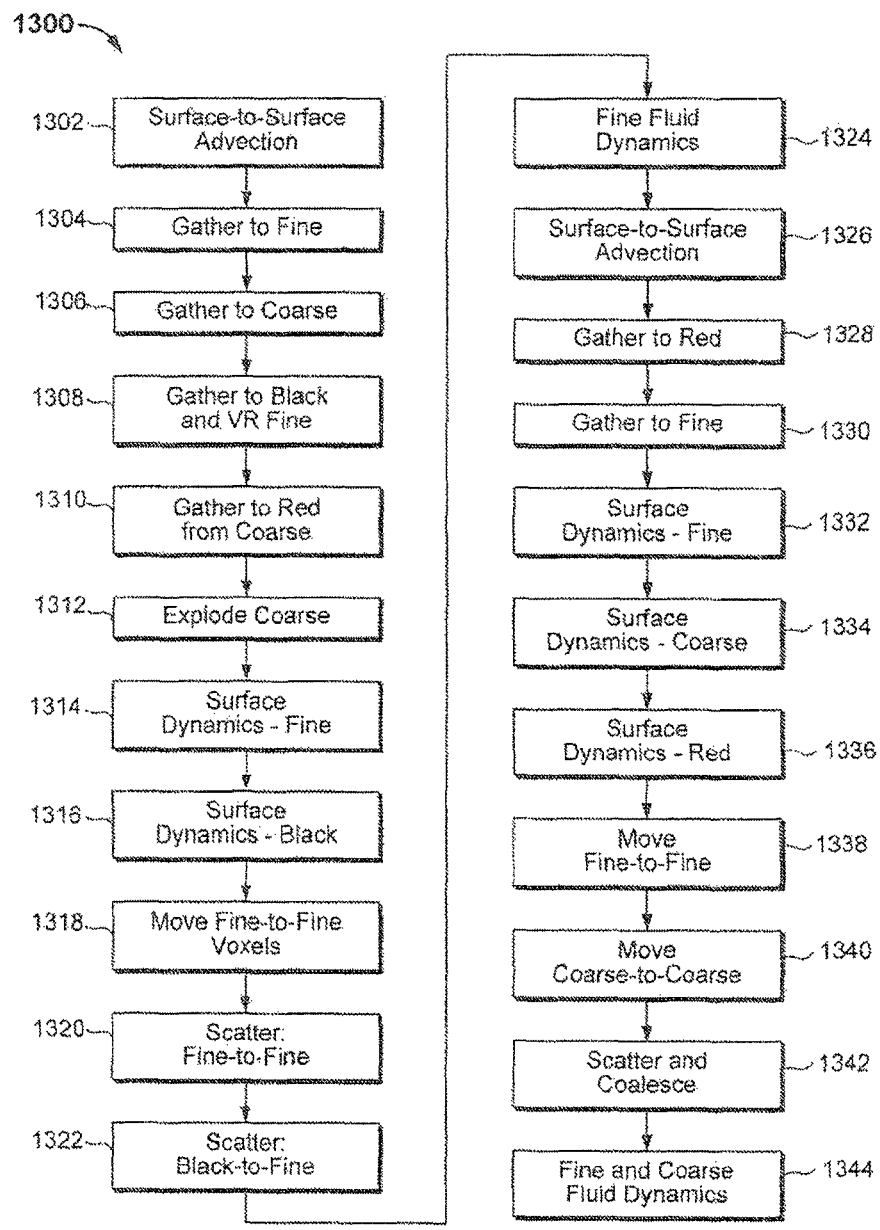
FIG. 13 is a flow chart of a procedure for simulating interactions with facets under variable resolution conditions.

Interactions with VR facets are handled using a variable resolution procedure 1300 illustrated in FIG. 13. Most steps of this procedure are carried out using the comparable steps discussed above for interactions with non-VR facets. The procedure 1300 is performed during a coarse time step (i.e., a time period corresponding to a coarse voxel) that includes two phases that each correspond to a fine time step. The facet surface dynamics are performed during each fine time step. For this reason, a VR interface facet $F_{\alpha IC}$ is considered as two identically sized and oriented fine facets that are referred to, respectively, as a black facet $F_{\alpha ICb}$ and a red facet $F_{\alpha ICr}$. The black facet $F_{\alpha ICb}$ is associated with the first fine time step within a coarse time step while the red facet $F_{\alpha ICr}$ is associated with the second fine time step within a coarse time step.

Initially, particles are moved (advected) between facets by a first surface-to-surface advection stage (step 1302). Particles are moved from black facets $F_{\alpha ICb}$ to coarse facets $F_{\beta C}$ with a weighting factor of $V_{-\alpha\beta}$ that corresponds to the volume of the unblocked portion of the coarse parallelepiped (FIG. 12, 1225) that extends from a facet $F_\alpha$ and that lies behind a facet $F_\beta$ less the unblocked portion of the fine parallelepiped (FIG. 12, 1245) that extends from the facet $F_\alpha$ and that lies behind the facet $F_\beta$. The magnitude of $c_i$ for a fine voxel is one half the magnitude of $c_i$ for a coarse voxel. As discussed above, the volume of a parallelepiped for a facet $F_\alpha$ is defined as:

$$V_{i\alpha} = |c_i n_\alpha| A_\alpha. \qquad \text{Eq. (37)}$$

Accordingly, because the surface area $A_\alpha$ of a facet does not change between coarse and fine parallelepipeds, and because the unit normal $n_\alpha$ always has a magnitude of one, the volume of a fine parallelepiped corresponding to a facet is one half the volume of the corresponding coarse parallelepiped for the facet.

Particles are moved from coarse facets $F_{\alpha C}$ to black facets $F_{\beta ICb}$ with a weighting factor of $V_{\alpha\beta}$ that corresponds to the volume of the unblocked portion of the fine parallelepiped that extends from a facet $F_\alpha$ and that lies behind a facet $F_\beta$.

Particles are moved from red facets $F_{\alpha ICr}$ to coarse facets $F_{\beta C}$ with a weighting factor of $V_{\alpha\beta}$, and from coarse facets $F_{\alpha C}$ to red facets $F_{\beta ICr}$ with a weighting factor of $V_{-\alpha\beta}$.

Particles are moved from red facets $F_{\alpha ICr}$ to black facets $F_{\beta ICb}$ with a weighting factor of $V_{\alpha\beta}$. In this stage, black-to-red advections do not occur. In addition, because the black and red facets represent consecutive time steps, black-to-black advections (or red-to-red advections) never occur. For similar reasons, particles in this stage are moved from red facets $F_{\alpha ICr}$ to fine facets $F_{\beta IF}$ or $F_{\beta F}$ with a weighting factor of $V_{\alpha\beta}$, and from fine facets $F_{\alpha IF}$ or $F_{\alpha F}$ to black facets $F_{\alpha ICb}$ with the same weighting factor.

Finally, particles are moved from fine facets $F_{\alpha IF}$ or $F_{\alpha F}$ to other fine facets $F_{\beta IF}$ or $F_{\beta F}$ with the same weighting factor, and from coarse facets $F_{\alpha C}$ to other coarse facets $F_C$ with a weighting factor of $V_{C\alpha\beta}$ that corresponds to the volume of the unblocked portion of the coarse parallelepiped that extends from a facet $F_\alpha$ and that lies behind a facet $F_\beta$.

After particles are advected between surfaces, particles are gathered from the voxels in a first gather stage (steps 1304-1310). Particles are gathered for fine facets $F_{\alpha F}$ from fine voxels using fine parallelepipeds (step 1304), and for coarse facets $F_{\alpha C}$ from coarse voxels using coarse parallelepipeds (step 1306). Particles are then gathered for black facets $F_{\alpha IRb}$ and for VR fine facets $F_{\alpha IF}$ from both coarse and fine voxels using fine parallelepipeds (step 1308). Finally, particles are gathered for red facets $F_{\alpha IRr}$ from coarse voxels using the differences between coarse parallelepipeds and fine parallelepipeds (step 1310).

Next, coarse voxels that interact with fine voxels or VR facets are exploded into a collection of fine voxels (step 1312). The states of a coarse voxel that will transmit particles to a fine voxel within a single coarse time step are exploded. For example, the appropriate states of a coarse voxel that is not intersected by a facet are exploded into eight fine voxels oriented like the microblock of FIG. 4. The appropriate states of coarse voxel that is intersected by one or more facets are exploded into a collection of complete and/or partial fine voxels corresponding to the portion of the coarse voxel that is not intersected by any facets. The particle densities $N_i(x)$ for a coarse voxel and the fine voxels resulting from the explosion thereof are equal, but the fine voxels may have fractional factors $P_f$ that differ from the fractional factor of the coarse voxel and from the fractional factors of the other fine voxels.

Thereafter, surface dynamics are performed for the fine facets $F_{\alpha IF}$ and $F_{\alpha F}$ (step 1314), and for the black facets $F_{\alpha ICb}$ (step 1316). Dynamics are performed using the procedure illustrated in FIG. 11 and discussed above.

Next, particles are moved between fine voxels (step 1318) including actual fine voxels and fine voxels resulting from the explosion of coarse voxels. Once the particles have been moved, particles are scattered from the fine facets $F_{\alpha IF}$ and $F_{\alpha F}$ to the fine voxels (step 1320).

Particles are also scattered from the black facets $F_{\alpha ICb}$ to the fine voxels (including the fine voxels that result from exploding a coarse voxel) (step 1322). Particles are scattered to a fine voxel if the voxel would have received particles at that time absent the presence of a surface. In particular, particles are scattered to a voxel $N(x)$ when the voxel is an actual fine voxel (as opposed to a fine voxel resulting from the explosion of a coarse voxel), when a voxel $N(x+c_i)$ that is one velocity unit beyond the voxel $N(x)$ is an actual fine voxel, or when the voxel $N(x+c_i)$ that is one velocity unit beyond the voxel $N(x)$ is a fine voxel resulting from the explosion of a coarse voxel.

Finally, the first fine time step is completed by performing fluid dynamics on the fine voxels (step 1324). The voxels for which fluid dynamics are performed do not include the fine voxels that result from exploding a coarse voxel (step 1312).

The procedure 1300 implements similar steps during the second fine time step. Initially, particles are moved between surfaces in a second surface-to-surface advection stage (step 1326). Particles are advected from black facets to red facets, from black facets to fine facets, from fine facets to red facets, and from fine facets to fine facets.

After particles are advected between surfaces, particles are gathered from the voxels in a second gather stage (steps 1328-1330). Particles are gathered for red facets $F_{\alpha IRr}$ from fine voxels using fine parallelepipeds (step 1328). Particles also are gathered for fine facets $F_{\alpha F}$ and $F_{\alpha IF}$ from fine voxels using fine parallelepipeds (step 1330).

Thereafter, surface dynamics are performed for the fine facets $F_{\alpha IF}$ and $F_{\alpha F}$ (step 1332), for the coarse facets $F_{\alpha C}$ (step 1134), and for the red facets $F_{\alpha ICr}$ (step 1336) as discussed above.

Next, particles are moved between voxels using fine resolution (step 1338) so that particles are moved to and from fine voxels and fine voxels representative of coarse voxels. Particles are then moved between voxels using coarse resolution (step 1340) so that particles are moved to and from coarse voxels.

Next, in a combined step, particles are scattered from the facets to the voxels while the fine voxels that represent coarse voxels (i.e., the fine voxels resulting from exploding coarse voxels) are coalesced into coarse voxels (step 1342). In this combined step, particles are scattered from coarse facets to coarse voxels using coarse parallelepipeds, from fine facets to fine voxels using fine parallelepipeds, from red facets to fine or coarse voxels using fine parallelepipeds, and from black facets to coarse voxels using the differences between coarse parallelepipeds and find parallelepipeds. Finally, fluid dynamics are performed for the fine voxels and the coarse voxels (step 1344).

F. Porous Media Interface Model

The resistance of fluid flow through a porous media (PM) is commonly described by Darcy's law, which states that the pressure drop between two points is proportional to the flow rate "ρu" and the distance L between the two points:

$$p2-p1=\sigma L\rho u,$$

where "σ" is the PM resistivity. For flow through a PM with high porosity Φ close to 1, where porosity (between 0 and 1) is defined as the volume ratio of PM pores, the flow details at the interface between the PM and fluid generally may be neglected. However, for a PM with low porosity, the interface effect may be significant for certain types of applications, such as flow acoustics.

Figure 14:
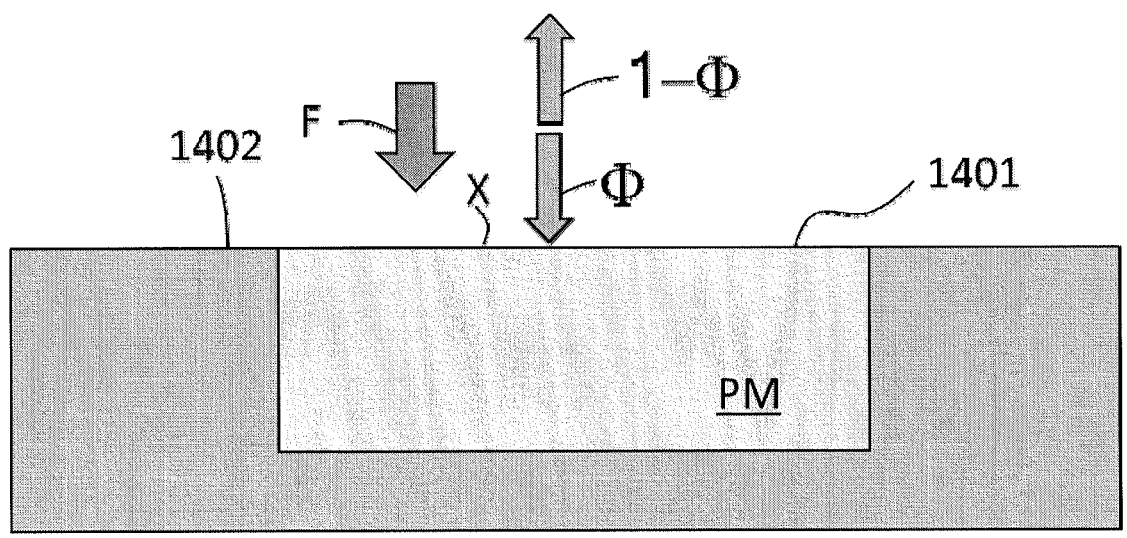
FIG. 14 is a schematic view of an exemplary porous media model.

For example, FIG. 14 illustrates a fluid F flowing toward an interface surface 1401 of a porous medium PM with porosity Φ. In a unit area 1402 on the interface surface 1401, the fraction of the surface that is penetrable and into which the fluid may flow is only Φ. By contrast, the fraction of the surface that is blocked by the PM solid structure is 1−Φ. As a result, only a Φ fraction of fluid F in each unit area on the surface can enter the PM, while the 1−Φ fractional part of the fluid F is blocked by the PM solid wall and stays on the fluid side of the interface surface 1401. In a kinetic approach, such as the LBM approach, such a partial fluid penetration can be realized efficiently. Since a fluid is represented by fluid particles, i.e., fluid fluxes, such as mass momentum energy fluxes, and particle distributions, the Φ fraction of particles is allowed to move into the PM during particle advection, and the 1−Φ fraction of particles is constrained by the PM solid wall boundary condition (BC). Here, the fluid particles may include particle distributions or fluxes of hydrodynamic and thermodynamic properties such as mass fluxes, momentum fluxes, and energy fluxes. Additionally, the fluid particles, or elements, may include properties such as mass, density, momentum, pressure, velocity, temperature, and energy. Moreover, the elements may be associated with any fluid, flow, or thermodynamic related quantity although not exhaustively identified herein.

Either a frictional wall (bounce-back or turbulent wall) BC or a frictionless wall BC can be applied. The fraction of particles allowed to move into the PM affects the mass and momentum conditions in the direction normal to the interface. For the tangential behavior at the interface, either a frictionless wall or a frictional wall BC can be applied (as is true for a "typical" wall boundary). A frictionless wall BC maintains the surface tangential fluid velocity on the wall by not modifying the flux of tangential momentum at the interface. A frictional wall BC does alter the tangential momentum flux to achieve, for example, a no-slip wall boundary condition, or a turbulent wall model. These wall BCs ensure that there is zero mass flux across the wall. When porosity Φ equals 1, the wall portion of the PM effectively disappears and the partial wall model ceases to have effect.

While the fraction of particles passing from the fluid into the PM is controlled by the porosity of the PM, particles leaving the PM can move freely because they encounter no solid obstacle from the fluid side. These particles together with the particles that were blocked from entering the PM form the total particle flow into the fluid side.

Figure 15:
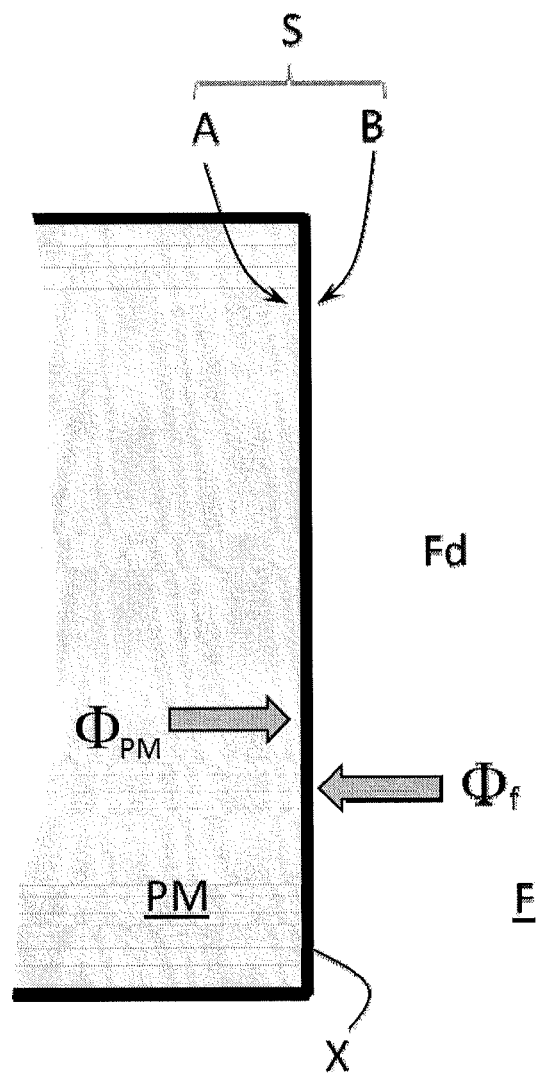
FIG. 15 is a schematic view of exemplary double-sided surfels.

The PM interface X can be described by so-called double-sided surface elements (i.e, surfels), as shown in FIG. 15. In such double-sided surfels, a set of paired surfels S form a double-layered surface having an inner surface A and outer surface B. The inner surface A interacts with the PM and the outer surface B interacts with fluid domain Fd. There is no gap between the inner and outer surfaces A and B. For convenience of computation, each inner surfel has the exact same shape and size as its paired outer surfel, and each inner surfel is only in touch with the paired outer surfel. The standard surfel gather and scatter scheme is performed on each side of the surface A, B, and with the condition that the $\Phi_f$ fraction of incoming particles from the fluid side F pass through to the PM side while all of the incoming particles $\Phi_{PM}$ from the PM side pass through to the fluid side F. Advantages of this approach include simplified handling of the complex PM interface, exact satisfaction of conservation laws, and easy realization of specified fluid boundary conditions on PM interface.

This approach, in effect, introduces a PM interface resistance which is not proportional to a PM thickness and therefore cannot be included in approximation of Darcy's law. The approach accounts for the flow details at the PM interface and improves simulation results of certain types of flow problems, such as the modeling of acoustic absorption.

Figure 16:
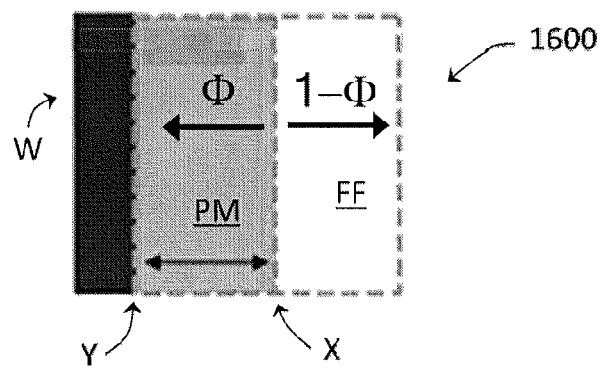
FIG. 16 is a schematic view of an exemplary system for modeling acoustic absorption.

For example, referring to FIG. 16, in a system 1600 for modeling acoustic absorption, a fluid flow region FF may be adjacent to a region PM occupied by a PM material with sound absorbing properties, with a PM interface X providing the interface between the fluid flow region FF and the region PM, and a wall interface Y providing the interface between the region PM and a wall W. The fluid flow region FF and the region PM can be, in effect, treated as two separate simulation spaces having different properties (e.g., in the region PM, an increased impedance may be used to account for the presence of the PM impedance), with movements Φ and 1−Φ between the two simulation spaces FF, PM being governed by the properties of the PM interface, as discussed above.

Acoustic absorption by porous materials is an important topic in acoustics engineering. At a microscopic scale, the propagation of sound in porous media is difficult to characterize because of the topological complexity of the materials. At a macroscopic scale, porous materials with high porosity can be treated as regions of fluid which have modified properties relative to air. Sound propagation in such media can be expressed in the form of two intrinsic, frequency-dependent, and volumetric properties of the material: the characteristic impedance and the complex acoustic wave number. Under certain assumptions, a given volumetric model for sound propagation in an absorbing material can be put in the form of locally-reacting, frequency-dependent, complex impedance at the interface between two different media. For example, impedance models, such as Boundary Element Methods (BEM), Finite Elements Methods (FEM), and Statistical Energy Analysis (SEA) methods, and are implemented as boundary conditions in the frequency domain.

For problems involving flow-induced noise, suitable Computational Fluid Dynamics (CFD) and/or Computational AeroAcoustics (CAA) numerical methods are non-linear and often time-explicit. For a time-explicit solution, time-domain surface impedance boundary conditions could likewise allow modeling of acoustic absorption due to porous materials. However, even when a time-domain surface impedance formulation can be derived, stability and robustness appear to be challenging problems to overcome. An exemplary approach includes modeling of absorbing materials as volumetric fluid regions, such that sound waves travel through the material and dissipate via a momentum sink. This is related to the method for macroscopic modeling of flow through porous media achieved by relating the momentum sink to the flow resistance of the material following Darcy's law. For an exemplary acoustic absorption modeling method, there is the question of how to determine the momentum sink to achieve a desired absorption behavior. If the acoustic absorption is governed (or at least dominated) by the same physical mechanisms as the flow resistivity, then the same momentum sink behavior used to achieve the correct flow resistivity for a particular porous material should also achieve the correct acoustic absorption for that material. This approach should be valid for any passive and homogeneous porous material. Moreover, numerical stability problems should be removed since the impedance is realized in a way that is inherently well-posed (i.e. passive, causal, and real conditions are satisfied).

According to this exemplary approach, a time-explicit CFD/CAA solution method based on the Lattice Boltzmann Method (LBM), which has evolved over the last two decades as an alternative numerical method to traditional CFD, may be used. Unlike methods based on discretizing the macroscopic continuum equations, LBM starts from a "mesoscopic" Boltzmann kinetic equation to predict macroscopic fluid dynamics. The resulting compressible and unsteady solution method may be used for predicting a variety of complex flow physics, such as aeroacoustics and pure acoustics problems. A porous media model is used to represent the flow resistivity of various components, such as air filters, radiators, heat exchangers, evaporators, and other components, which are encountered in simulating flow, such as through HVAC systems, vehicle engine compartments, and other applications.

Figure 17A:
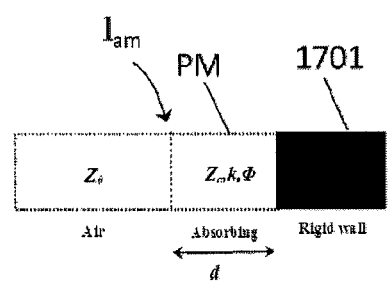
FIGS. 17A and 17B are schematic views of other exemplary porous media models.

The propagation of sound waves inside a homogeneous and passive absorbing material with a porosity close to Φ=1 is macroscopically fully characterized by the material's characteristic impedance $Z_c(\omega)$ and complex wave number $k(\omega)$. By performing measurements on various porous and fibrous materials, many semi-empirical models are derived, such as the Delany-Bazley or Allard-Champoux 3-parameter models. For example, the Allard-Champoux 3-parameter model is given by:

$$Z_c(\omega) = \rho_0 c_0 [1 + 0.008127 X^{-0.75} - j0.001228 X^{-0.73}] \quad \text{(Eq. 38)}$$

$$k(\omega) = \frac{\omega}{c_0}[1 + 0.085787 X^{-0.70} - j0.174919 X^{-0.59}] \quad \text{(Eq. 39)}$$

where $\rho_0$ is the density of air, $c_0$ the sound speed in air, and X is a dimensionless parameter equal to $X=\rho_0 \omega/2\pi\sigma$ with σ the flow resistivity. This model is considered valid for 0.01<X<0.1. For the situation of a layer of porous material PM of uniform thickness "d" backed by an impervious rigid wall 1701, as shown in FIG. 17A, the complex impedance $Z_s(\omega)$ at normal incidence at the air/material interface $I_{am}$ is:

$$Z_s(\omega) = -j\frac{1}{\phi}Z_c(\omega)\cos(k(\omega)\cdot d) \quad \text{(Eq. 40)}$$

Figure 17B:
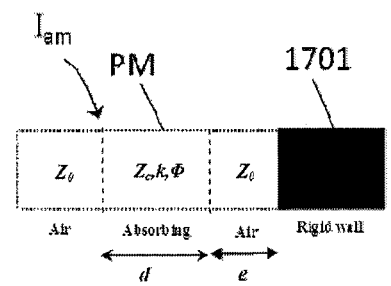

As shown in FIG. 17B, in which there is a layer of air of thickness "e" in between the porous material PM and the rigid wall 1701, the expression for $Z_s(\omega)$ becomes:

$$Z_s(\omega) = -\frac{1}{\phi}Z_c(\omega)\frac{-jZ_a(\omega)\cot(k(\omega)\cdot e) + Z_c(\omega)}{Z_a(\omega) - jZ_c(\omega)\cot(k(\omega)\cdot e)} \quad \text{(Eq. 41)}$$

with $Z_a(\omega) = -jZ_0 \cdot \cot(k_0(\omega) \cdot d)$, $k_0(\omega) = \omega/c_0$.

The complex surface impedance $Z_s(\omega)$ is expressed as a function of its real and imaginary parts, the resistance $R(\omega)$ and the reactance $X(\omega)$, respectively. For passive materials, characterized by $R(\omega) > 0$ (i.e. positive resistance), the material absorption coefficient a(co) is defined by:

$$\alpha(\omega) = 1 - \left|\frac{1 - Z_s}{1 + Z_s}\right|^2 \quad \text{(Eq. 42)}$$

The surface impedance can be measured in an impedance tube using a two-microphone method as described below.

The LBM-based method can be used to compute unsteady flow and the generation and propagation of acoustics waves. In LBM, external forces can be included in the fluid dynamics by altering the local-instantaneous particle distributions during the collision step. The external force applied per unit time effectively becomes a momentum source/sink. This technique can be used, for example, to model buoyancy effects due to gravity. The method implements a porous media model by applying an external force based on Darcy's law for flow resistivity as a function of flow velocity. The effect of a porous medium on the flow is achieved by removing an amount of momentum at each volumetric location of the porous region such that the correct pressure gradient is achieved, resulting in the correct overall pressure drop.

Figure 18:
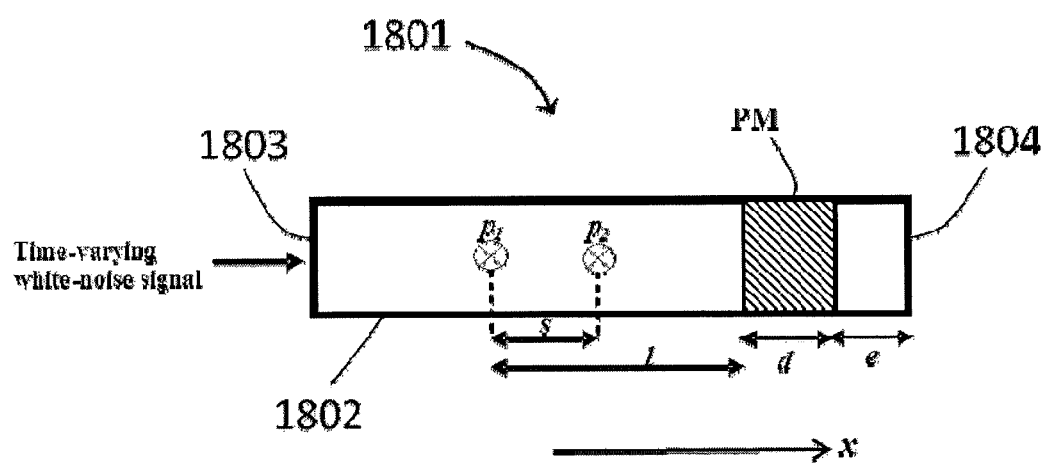
FIG. 18 is a schematic view of another exemplary porous media model.

To assess the effect of the porous media model on acoustics propagation, a 3D circular impedance tube 1801, as shown in FIG. 18, can be simulated. For example, the tube dimensions are length L=0.772 m and diameter D=0.0515 m, and the frequency range for valid usage of the tube 1801 may be, for example, 100 Hz-3000 Hz. The tube walls 1802 are presumed as rigid and frictionless, and a time-varying pressure boundary condition representing white noise is applied at the inlet 1803. The layer of thickness "d" represents an absorbing material and is a porous media region PM, characterized by flow resistivity $\sigma_x$ in the x-direction and infinite resistance in the other directions. An air layer of thickness "e" can be included between the porous media region PM and the right-hand side rigid wall 1804. Uniform grid resolution may be used, for example, with 30 points per wavelength at f=3000 Hz, i.e. $\Delta x$=1.7 mm, ensuring low numerical dissipation of acoustic waves. The time step is $\Delta t$=4.56×10$^{-6}$ s and the simulations are run for a time of T=2 s, which was observed to be a sufficient physical time for the results to evolve beyond the startup transient period and provide meaningful statistics.

Pressure time histories are recorded inside the tube at two virtual microphones $p_1(x_1, t)$ and $p_2(x_2, t)$. Using $x_1 - x_2 = s$ and $x_1 = 1$, the surface complex impedance at x=0 is given by the following expression:

$$\frac{Z_s}{Z_0} = j\frac{h_{12}\sin(kl) - \sin[k(l-s)]}{\cos[k(l-s)] - h_{12}\cos(kl)} \quad \text{(Eq. 43)}$$

with $h_{12}$ the complex transfer function between $p_1$ and $p_2$, and wave number $k = \omega/c_0 = 2\pi f/c_0$. From this expression, acoustic resistance, reactance, and absorption coefficient can be derived and compared to semi-empirical models and experimental results.

TABLE 1

| Configuration | d (mm) | e (mm) | $\sigma_x$ (rayls/m) | Equivalent material type |
|---|---|---|---|---|
| A | 0 | 0 | 0 | None (Air) |
| B | 26.5 | 0 | 23150 | Felt |
| C | 26.5 | 48.5 | 23150 | Felt |
| D | 26.5 | 120.0 | 23150 | Felt |
| E | 26.5 | 0.0 | 14150 | Foam |
| F | 26.5 | 120.0 | 14150 | Foam |
| G | 26.5 | 0 | 200 | Air filter |

Figure 19:
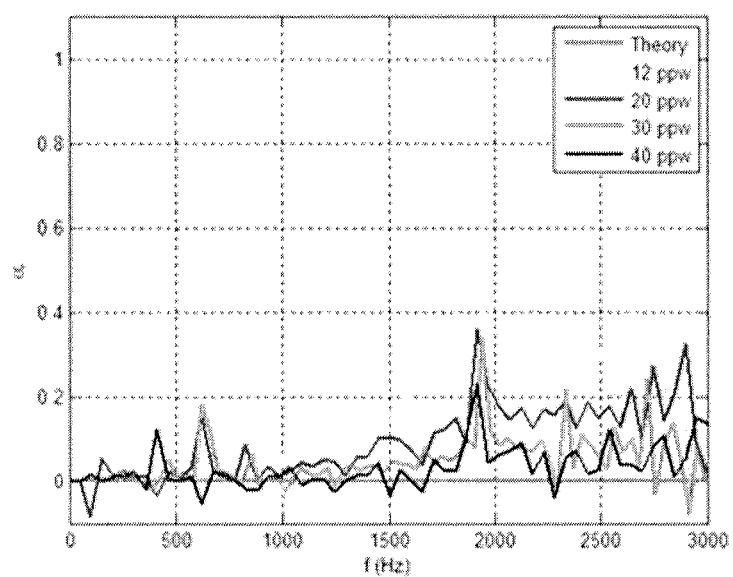
FIG. 19 illustrates absorption coefficients as a function of frequency.

Simulated configurations, as shown in Table 1, are compared to the Allard-Champoux model (Equations 38 and 39). As shown by Configuration A (no absorbing layer), the convergence of the results with respect to the grid resolution and characterization of any residual absorption of the numerical system result. As shown in FIG. 19 for Configuration A, residual absorption is close to zero at low frequencies, while at high frequencies (f>1500 Hz), some absorption is measured for the coarser resolutions. This is related to increasing numerical dissipation of acoustics in both the air and at the solid boundaries as the grid is made coarser. This will be detailed more precisely in the final paper. For 40 points per wavelength (ppw), the residual absorption is less than 5% for f<3000 Hz, which may be considered to be satisfactory. The peaks at 1900 Hz and 2650 Hz are related to poles of Equation 42, and correspond to numerical and signal processing artifacts. As shown by Configuration G, which corresponds to a typical air filter in an automotive HVAC system, with a flow resistivity $\sigma_x$=100 rayls/m.

Figure 20:
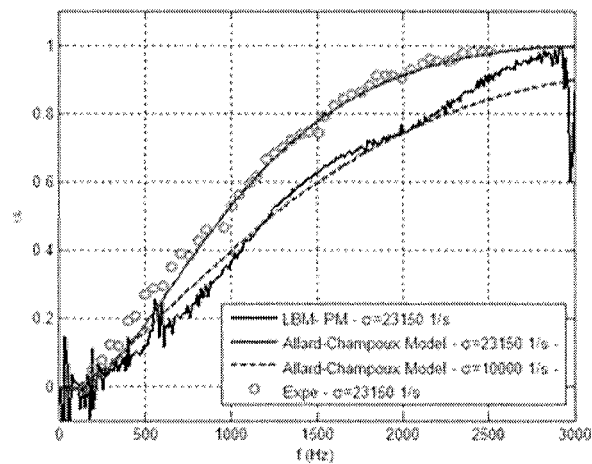
FIGS. 20-22 illustrate absorption coefficients as functions of frequency.
Figure 21:
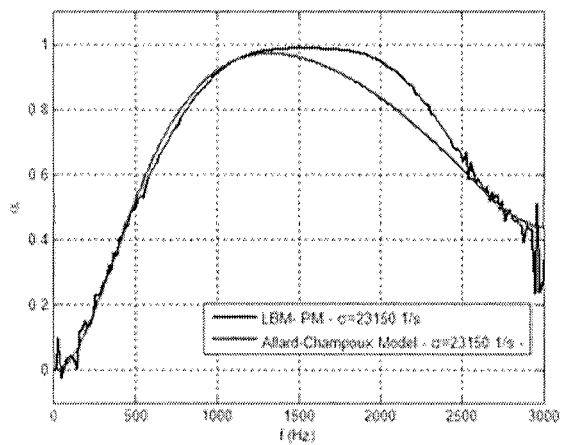
Figure 22:
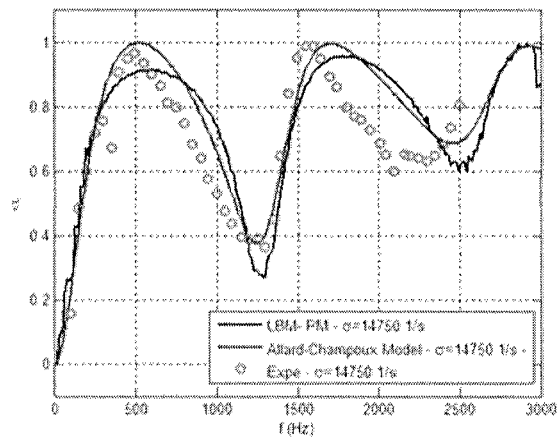

In FIGS. 20-22, some exemplary preliminary results are shown with a 30 ppw simulation with LBM-PM model results, Allard-Champoux model results, and experimental data. In FIG. 20 for Configuration B, the thickness "d" of the PM is 26.5 mm, the thickness "e" of the air is 0.0 mm, and flow resistivity "σ" is 23150 rayls/m. In FIG. 21 for Configuration C, the thickness "d" of the PM is 26.5 mm, the thickness "e" of the air is 48.5 mm, and the flow resistivity "σ" is 23150 rayls/m. In FIG. 22 for Configuration D, the thickness "d" of the PM is 120.0 mm, the thickness "e" of the air is 48.5 mm, and the flow resistivity "σ" is 23150 rayls/m. Here, as demonstrated by FIGS. 20-22, the validity of the Allard-Champoux model is confirmed, and the simulation results also correlate well to the LBM-PM model and to the experimental results. The frequency dependence of the absorption coefficient is well-captured for each Configuration, including non-monotonic behavior.

For configuration G, corresponding to a typical air filter in a HVAC system, for example, the acoustic absorption is relatively small. Thus, the LBM-PM model approach correctly captures both flow and acoustic effects, even for a material that has a significant flow resistance effect but a negligible effect on acoustics.

Accurate prediction of fan noise is an important issue in the field of aeroacoustics. As vehicle manufacturers seek to reduce the noise levels experienced by passengers, the noise due to the heating, ventilation, and air conditioning (HVAC) system becomes a target for improved acoustic performance, The HVAC system is complex, consisting of a blower and mixing unit coupled to many ducts through which air is transported to various locations, including faces and feet of front and rear passengers, as well as windshield and sideglass defrost. The blower must supply sufficient pressure head to achieve desired air flow rates for each thermal comfort setting. Noise is generated due to the blower rotation, and by the turbulent air flow in the mixing unit, through the twists and turns of the ducts, and exiting the registers (ventilation outlets). When designing an HVAC system it is difficult to predict whether noise targets will be met, and to find the best compromise between flow, thermal, and acoustic performance while meeting packaging constraints. The effects of integrating the HVAC system into the vehicle, which changes the performance relative to the test bench, must also be accounted for.

Figure 23:
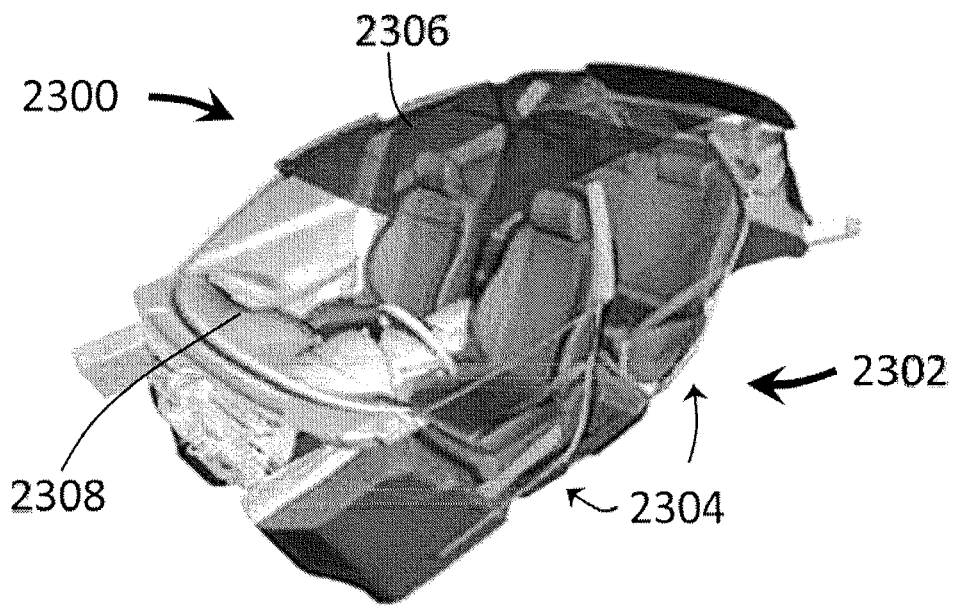
FIG. 23 illustrates an interior of a vehicle.

For example, as exemplified in FIG. 23, noise heard by passengers due to the HVAC system of a vehicle 2300, which involves many sources and paths, may be the noise absorbed at an interior cabin 2302. For example, the noise may result from a blower of the vehicle that includes a radial fan which generates noise from the interaction of the moving blades with the surrounding air, and the impact of the moving air on nearby static components, such as seats 2304 and interior roof 2306 of the vehicle. This fan noise is acoustically propagated through the complex network of ducts, out of the registers, and into the interior cabin 2302. The duct and mixing unit flow noise sources are generated mainly by flow separations and vortices resulting from the detailed geometric features, and are also acoustically propagated through the system. Noise due to the flow exiting the registers depends on the fine details of the grill and its orientation, and the resulting outlet jets which mix with the ambient air and may impact surfaces, such as the windshield 2308 (e.g., for defrost). Therefore, the requirements for numerical flow-acoustic predictions may be accomplished using the exemplary modeling, as detailed above, whereby the interior cabin 2302 may be considered a fluid of a first volume and the static components and surfaces within the interior cabin 2302 may be considered a second volume occupied by a porous medium. By implementing the exemplary modeling, complex geometries may be investigated to provide predictions of the fan and flow induced noise sources, and their acoustic propagation all the way through the system to the locations of the passengers at the interior cabin 2302 of the vehicle 2300.

The exemplary modeling provides accurate numerical noise prediction for fully detailed automotive HVAC systems, such as accurate predictions of the complex flow structures, corresponding noise sources, and resulting propagated acoustics to the passenger head space locations, including effects of geometric details throughout the integrated system. The transient flow characteristics and acoustics can be determined, including the rotating fan flow and noise, as well as direct prediction of acoustic propagation throughout the system. The exemplary modeling can obtain early noise assessment of proposed designs and evaluate potential design options, and/or diagnose and improve noise problems on an existing design. In addition, the exemplary model provides visualization capabilities to allow identification and insight into sources of noise, including band-filtered pressure analyses to isolate phenomena at specific frequency bands of interest. Predicted spectra at passenger locations can be converted to audio files for comparative listening to the effects of various design options. The exemplary modeling also provides accurate HVAC system pressures, flow rates, and thermal mixing behavior—hence it can be used to assess multi-disciplinary design tradeoffs to design the HVAC system with optimal aero, thermal, and acoustic performance.

In another example, the operation of transportation vehicles and heavy machinery results in sound propagated through the air Which reaches people in the surrounding areas and is known as community (or environmental) noise. Increased usage of air and ground transportation has brought significant increases in community noise, with proven adverse health effects. This noise pollution is now considered a serious problem and is government regulated in most countries, with the specific regulations varying by industry and vehicle type as well as from country to country. It is important to design products that do not exceed regulated noise targets, which involve the sound levels reaching an observer at a specified location or distance relative to the moving vehicle or stationary equipment. To assess whether a target will be met, key sources of noise generated by turbulent flow or mechanical vibration in the near-field and the resulting sound propagation to the observer in the far-field must be determined.

A major part of designing towards meeting noise targets is to assess and reduce noise sources while dealing with the multitude of other design constraints. Experimental testing challenges also include wind tunnel space limitations for extending measurements to the far-field, and relating stationary source wind tunnel measurements to the real life moving source scenario. A key challenge faced by both experimental and numerical techniques in the identification of flow-induced noise sources is that sound propagated to the far-field consists of pressure perturbations, which may be very small relative to the turbulent pressure fluctuations in the near-field source region. Hence, according to the exemplary modeling, as detailed above, predictions of both the noise sources and the resulting acoustic propagation may be accomplished to achieve highly accurate transient flow behavior, and sufficiently low dissipation and dispersion, to resolve small amplitude fluctuations over the frequency range of interest. Moreover, in typical applications, such as aircraft or train certification, the far-field noise target involves large distances making it impractical to extend the computational domain to include both the source region and the observer.

Figure 24:
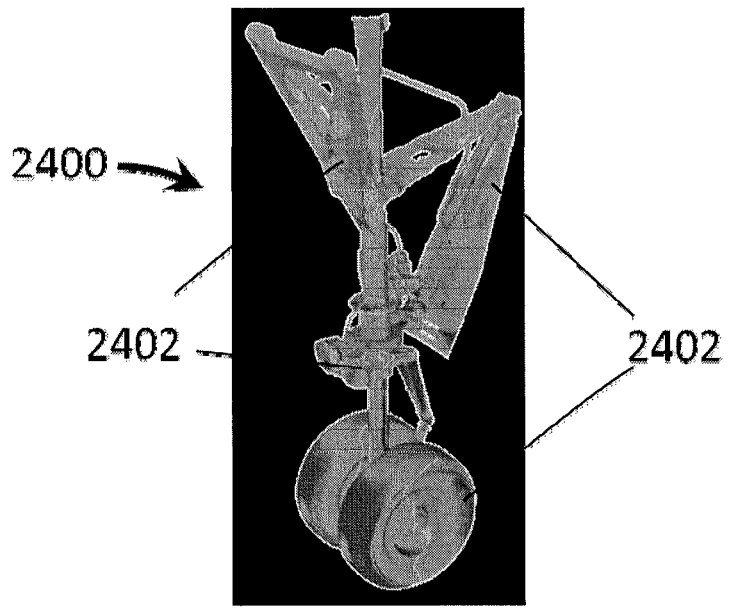
FIG. 24 illustrates an aircraft landing system.

To predict far-field noise, the exemplary modeling may be used to provide detailed flow behavior and resulting near-field sources for either a vehicle component of interest, such as an aircraft landing gear assembly 2400, as shown in FIG. 24, or a complete vehicle. According to the exemplary modeling, transient solutions accurately predict the complex time-dependent flow structures, corresponding noise sources, and can accommodate the required realistic detailed geometry, such various components 2402 of the aircraft landing gear assembly 2400. The results can be coupled to a far-field propagation module to easily and efficiently predict the far-field noise at any location, whereby the region surrounding the aircraft landing gear assembly 2400 may be considered a fluid of a first volume and regions between the components 2402 of the aircraft landing gear assembly 2400 may be represented as a second volume occupied by a porous medium. The exemplary modeling allows for early noise assessment and optimization, including noise certification evaluation (e.g. using the Evolution of Perceived Noise Level EPNL metric) before a final prototype is built, in addition, visualization of the exemplary modeling can provide insight into sources of noise, including band-filtered pressure analyses to isolate phenomena at specific frequency bands of interest, for example to find the cause of a peak observed in a far-field spectrum.

A number of implementations have been described. Nevertheless, it will be understood that various modifications may be made without departing from the spirit and scope of the claims. Accordingly, other implementations are within the scope of the following claims.

What is claimed is:

1. A computer-implemented method for characterizing fluid flow and acoustic properties of a system that comprises at least one porous medium, the method comprising:

modeling the at least one porous medium as a first volumetric fluid region, in a simulation space, in which fluid flows and sound waves travel through the at least one porous medium and dissipate via a first momentum sink that accounts for pressure and acoustic losses of the at least one porous medium modeled in the simulation space;

wherein the first momentum sink that is modeled removes one or more amounts of momentum at a plurality of volumetric locations within the first volumetric fluid region to model the pressure losses and acoustical losses in the at least one porous medium;

simulating, in the simulation space, fluid flow and propagation of acoustic waves in the first volumetric fluid region, the activity of the fluid in the first volumetric fluid region being simulated so as to model movement of elements within the first volumetric fluid region and using a first model having a first set of parameters that comprises a parameter for the first momentum sink;

obtaining, based on using the first momentum sink in simulating fluid flow and propagation of acoustic waves in the first volumetric fluid region, (i) pressure losses, and (ii) acoustical losses of the at least one porous medium modeled in the first volumetric fluid region;

simulating, in the simulation space, fluid flow and propagation of acoustic waves in a second volumetric fluid region adjoining the first volumetric fluid region in the simulation space, the activity in the second volumetric fluid region being simulated so as to model movement of elements within the second volumetric fluid region and using a second model having a second set of parameters that comprises a parameter for the second momentum sink; and modeling, based on the simulations, fluid flow and propagation of acoustic waves in (i) the first volumetric fluid region, (ii) the second volumetric fluid region, and (iii) between the first and second volumetric fluid regions in the simulation space to model fluid flow and propagation of acoustic waves in the system.

2. The method of claim 1, further comprising storing, in a computer-accessible memory, a first set of state vectors for voxels of the first volumetric fluid region and a second set of state vectors for voxels of the second first volumetric fluid region, wherein each of the state vectors comprises a plurality of entries that correspond to particular momentum states of possible momentum states at a corresponding voxel, wherein:

simulating fluid flow and propagation of acoustic waves in the first volumetric fluid region comprises:

performing first interaction operations on the first set of state vectors, the first interaction operations modeling interactions between elements of different momentum states according to the first model, and performing first move operations on the first set of state vectors to reflect movement of elements to new voxels in the first volumetric fluid region according to the first model; and simulating fluid flow and propagation of acoustic waves in the second volumetric fluid region comprises:

performing second interaction operations on the second set of state vectors, the second interaction operations modeling interactions between elements of different momentum states according to the second model, and performing second move operations on the second set of state vectors to reflect movement of elements to new voxels in the second volumetric fluid region according to the second model.

3. The method of claim 2, further comprising simulating flow resistance and acoustic absorption due to movement of elements between the first volumetric fluid region and the second volumetric fluid region at an interface between the first volumetric fluid region and the second volumetric fluid region by simulating movement of elements between state vectors of the first set of state vectors for voxels in the first volumetric fluid region at the interface and state vectors of the second set of state vectors for voxels in the second volumetric fluid region at the interface, and wherein movement of elements from the first volumetric fluid region to the second volumetric fluid region is governed by a first set of constraints and movement of elements from the second volumetric fluid region to the first volumetric fluid region is governed by a second set of constraints that differs from the first set of constraints.

4. The method of claim 3, wherein the first set of constraints permits a fraction of elements oriented to move from the first volumetric fluid region to the second volumetric fluid region to actually move from the first volumetric fluid region to the second volumetric fluid region, the fraction corresponding to a porosity of the at least one porous medium being simulated.

5. The method of claim 4, wherein the second set of constraints permits all elements oriented to move from the second volumetric fluid region to the first volumetric fluid region to actually move from the second volumetric fluid region to the first volumetric fluid region.

6. The method of claim 2, wherein the first set of parameters of the first model differs from the second set of parameters of the second model in a way that accounts for a porosity of the at least one porous medium being simulated.

7. The method of claim 2, wherein the first set of parameters of the first model differs from the second set of parameters of the second model in a way that accounts for one or more of acoustic resistance, acoustic absorption, and acoustic impedance of the at least one porous medium being simulated.

8. The method of claim 2, wherein the first set of parameters of the first model differs from the second set of parameters of the second model in a way that accounts for one or more of tortuosity, characteristic viscous length, thermal characteristic length, and thermal permeability of the at least one porous medium being simulated.

9. The method of claim 1, further comprising simulating flow resistance and acoustic absorption due to movement of elements between the first volumetric fluid region and the second volumetric fluid region at an interface between the first volumetric fluid region and the second volumetric fluid region by simulating movement of elements between a region of the first volumetric fluid region at the interface and a region of the second volumetric fluid region at the interface, and wherein movement of elements from the first volumetric fluid region to the second volumetric fluid region is governed by a first set of constraints and movement of elements from the second volumetric fluid region to the first volumetric fluid region is governed by a second set of constraints that differs from the first set of constraints.

10. The method of claim 9, wherein the first set of constraints permits a fraction of elements oriented to move from the first volumetric fluid region to the second volumetric fluid region to actually move from the first volumetric fluid region to the second volumetric fluid region, the fraction corresponding to a porosity of the at least one porous medium being simulated.

11. The method of claim 10, wherein the second set of constraints permits all elements oriented to move from the second volumetric fluid region to the first volumetric fluid region to actually move from the second volumetric fluid region to the first volumetric fluid region.

12. The method of claim 1, wherein the first set of parameters of the first model differs from the second set of parameters of the second model in a way that accounts for a porosity of the at least one porous medium being simulated.

13. The method of claim 1, wherein the first set of parameters of the first model differs from the second set of parameters of the second model in a way that accounts for one or more of acoustic resistance, acoustic absorption, and acoustic impedance of the at least one porous medium being simulated.

14. The method of claim 1, wherein the first set of parameters of the first model differs from the second set of parameters of the second model in a way that accounts for one or more of tortuosity, characteristic viscous length, thermal characteristic length, and thermal permeability of the at least one porous medium being simulated.

15. The method of claim 1, wherein the elements comprise particle distributions.

16. The method of claim 1, wherein the elements comprise one or more of mass, density, momentum, pressure, velocity, temperature, energy, mass fluxes, momentum fluxes, and energy fluxes within the fluid.

17. The method of claim 1, wherein the second volumetric fluid region models an interior cabin of a vehicle.

18. The method of claim 17, wherein the first volumetric fluid region models static components and surfaces within the interior cabin of the vehicle.

19. A computer-implemented method for characterizing fluid flow and acoustic properties of a system that comprises at least one porous medium, the method comprising:
modeling the at least one porous medium as a first volumetric fluid region, in a simulation space, in which fluid flows and sound waves travel through the at least one porous medium and dissipate via a first momentum sink that accounts for pressure and acoustic losses of the at least one porous medium modeled in the simulation space;
wherein the first momentum sink that is modeled removes one or more amounts of momentum at a plurality of volumetric locations within the first volumetric fluid region to model the pressure losses and acoustical losses in the at least one porous medium;
simulating, in the simulation space, fluid flow and propagation of acoustic waves in the first volumetric fluid region, the activity of the fluid in the first volumetric fluid region being simulated so as to model movement of elements within the first volumetric fluid region and using a first model having a first set of parameters that comprises a parameter for the first momentum sink;
obtaining, based on using the first momentum sink in simulating fluid flow and propagation of acoustic waves in the first volumetric fluid region, (i) pressure losses, and (ii) acoustical losses of the at least one porous medium modeled in the first volumetric fluid region;
simulating, in the simulation space, fluid flow and propagation of acoustic waves in a second volumetric fluid region occupied by the at least one porous medium, the second volumetric fluid region adjoining the first volumetric fluid region in the simulation space, the activity in the second volumetric fluid region being simulated so as to model movement of elements within the second volumetric fluid region and using a second model having a second set of parameters that comprises a parameter for the second momentum sink; and
simulating flow resistance and acoustic absorption due to movement of elements between the first volumetric fluid region and the second volumetric fluid region at an interface between the first volumetric fluid region and the second volumetric fluid region by simulating movement of elements between a region of the first volumetric fluid region at the interface and a region of the second volumetric fluid region at the interface with the movement of elements from the first volumetric fluid region to the second volumetric fluid region being governed by a first set of constraints and movement of elements from the second volumetric fluid region to the first volumetric fluid region being governed by a second set of constraints that differs from the first set of constraints, the first set of constraints permitting a fraction of elements oriented to move from the first volumetric fluid region to the second volumetric fluid region to actually move from the first volumetric fluid region to the second volumetric fluid region, the fraction corresponding to a porosity of the at least one porous medium being simulated.

20. The method of claim 19, wherein the second set of constraints permits all elements oriented to move from the second volumetric fluid region to the first volumetric fluid region to actually move from the second volumetric fluid region to the first volumetric fluid region.

21. The method of claim 19, further comprising storing, in a computer-accessible memory, a first set of state vectors for voxels of the first volumetric fluid region and a second set of state vectors for voxels of the second volumetric fluid region, wherein each of the state vectors comprises a plurality of entries that correspond to particular momentum states of possible momentum states at a corresponding voxel, wherein:
simulating fluid flow and propagation of acoustic waves in the first volumetric fluid region comprises:
performing first interaction operations on the first set of state vectors, the first interaction operations modeling flow and interactions between elements of different momentum states according to the first model, and
performing first move operations on the first set of state vectors to reflect movement of elements to new voxels in the first volumetric fluid region according to the first model; and
simulating fluid flow and propagation of acoustic waves in the second volumetric fluid region comprises:
performing second interaction operations on the second set of state vectors, the second interaction operations modeling flow and interactions between elements of different momentum states according to the second model, and
performing second move operations on the second set of state vectors to reflect movement of elements to new voxels in the second volumetric fluid region according to the second model.

22. The method of claim 19, wherein the first set of parameters of the first model differs from the second set of parameters of the second model in a way that accounts for a porosity of the at least one porous medium being simulated.

23. The method of claim 19, wherein the first set of parameters of the first model differs from the second set of parameters of the second model in a way that accounts for one or more of acoustic resistance, acoustic absorption, and acoustic impedance of the at least one porous medium being simulated.

24. The method of claim 19, wherein the first set of parameters of the first model differs from the second set of parameters of the second model in a way that accounts for one or more of tortuosity, characteristic viscous length, thermal characteristic length, and thermal permeability of the at least one porous medium being simulated.

25. The method of claim 19, wherein the elements comprise particle distributions.

26. The method of claim 19, wherein the elements comprise one or more of mass, density, momentum, pressure, velocity, temperature, energy, mass fluxes, momentum fluxes, and energy fluxes within the fluid.

27. A system for characterizing fluid flow and acoustic properties of a system that comprises at least one porous medium, the system being configured to:
 model the at least one porous medium as a first volumetric fluid region, in a simulation space, in which fluid flows and sound waves travel through the at least one porous medium and dissipate via a first momentum sink that accounts for pressure and acoustic losses of the at least one porous medium modeled in the simulation space;
 wherein the first momentum sink that is modeled removes one or more amounts of momentum at a plurality of volumetric locations within the first volumetric fluid region to model the pressure losses and acoustical losses in the at least one porous medium;
 simulate, in the simulation space, fluid flow and propagation of acoustic waves in the first volumetric fluid region, the activity of the fluid in the first volumetric fluid region being simulated so as to model movement of elements within the first volumetric fluid region and using a first model having a first set of parameters that comprises a parameter for the first momentum sink;
 obtain, based on using the first momentum sink in simulating fluid flow and propagation of acoustic waves in the first volumetric fluid region, (i) pressure losses, and (ii) acoustical losses of the at least one porous medium modeled in the first volumetric fluid region;
 simulate, in the simulation space, fluid flow and propagation of acoustic waves in a second volumetric fluid region adjoining the first volumetric fluid region in the simulation space, the activity in the second volumetric fluid region being simulated so as to model movement of elements within the second volumetric fluid region and using a second model having a second set of parameters that comprises a parameter for the second momentum sink; and
 model, based on the simulations, fluid flow and propagation of acoustic waves in (i) the first volumetric fluid region, (ii) the second volumetric fluid region, and (iii) between the first and second volumetric fluid regions in the simulation space to model fluid flow and propagation of acoustic waves in the system.

28. The system of claim 27, further configured to store, in a computer-accessible memory, a first set of state vectors for voxels of the first volumetric fluid region and a second set of state vectors for voxels of the second volumetric fluid region, wherein each of the state vectors comprises a plurality of entries that correspond to particular momentum states of possible momentum states at a corresponding voxel, wherein:
 simulating fluid flow and propagation of acoustic waves in the first volumetric fluid region comprises:
  performing first interaction operations on the first set of state vectors, the first interaction operations modeling interactions between elements of different momentum states according to the first model, and
  performing first move operations on the first set of state vectors to reflect movement of elements to new voxels in the first volumetric fluid region according to the first model; and
 simulating fluid flow and propagation of acoustic waves in the second volumetric fluid region comprises:
  performing second interaction operations on the second set of state vectors, the second interaction operations modeling flow and interactions between elements of different momentum states according to the second model, and
  performing second move operations on the second set of state vectors to reflect movement of elements to new voxels in the second volumetric fluid region according to the second model.

29. The system of claim 28, wherein the elements comprise particle distributions.

30. The system of claim 28, wherein the elements comprise one or more of mass, density, momentum, pressure, velocity, temperature, energy, mass fluxes, momentum fluxes, and energy fluxes within the fluid.

31. The system of claim 28, wherein simulating movement of elements between the first volumetric fluid region and the second volumetric fluid region at an interface between the first volumetric fluid region and the second volumetric fluid region comprises simulating movement of elements between a region of the first volumetric fluid region at the interface and a region of the second volumetric fluid region at the interface, and wherein movement of elements from the first volumetric fluid region to the second volumetric fluid region is governed by a first set of constraints and movement of elements from the second volumetric fluid region to the first volumetric fluid region is governed by a second set of constraints that differs from the first set of constraints.

32. The system of claim 31, wherein the first set of constraints permits a fraction of elements oriented to move from the first volumetric fluid region to the second volumetric fluid region to actually move from the first volumetric fluid region to the second volumetric fluid region, the fraction corresponding to a porosity of the at least one porous medium being simulated.

33. The system of claim 32, wherein the second set of constraints permits all elements oriented to move from the second volumetric fluid region to the first volumetric fluid region to actually move from the second volumetric fluid region to the first volumetric fluid region.

34. The system of claim 27, wherein the first set of parameters of the first model differs from the second set of parameters of the second model in a way that accounts for one or more of acoustic resistance, acoustic absorption, and acoustic impedance of the at least one porous medium being simulated.

35. The system of claim 27, wherein the first set of parameters of the first model differs from the second set of parameters of the second model in a way that accounts for one or more of tortuosity, characteristic viscous length, thermal characteristic length, and thermal permeability of the at least one porous medium being simulated.

36. A non-transitory computer-readable data storage medium storing computer-executable instructions that, when executed, characterize fluid flow and acoustic properties of a system that comprises at least one porous medium the instructions being configured, when executed, to cause a computer to perform actions comprising:

modeling the at least one porous medium as a first volumetric fluid region, in a simulation space, in which fluid flows and sound waves travel through the at least one porous medium and dissipate via a first momentum sink that accounts for pressure and acoustic losses of the at least one porous medium modeled in the simulation space;

wherein the first momentum sink that is modeled removes one or more amounts of momentum at a plurality of volumetric locations within the first volumetric fluid region to model the pressure losses and acoustical losses in the at least one porous medium;

simulating, in the simulation space, fluid flow and propagation of acoustic waves in the first volumetric fluid region, the activity of the fluid in the first volumetric fluid region being simulated so as to model movement of elements within the first volumetric fluid region and using a first model having a first set of parameters that comprises a parameter for the first momentum sink;

obtaining, based on using the first momentum sink in simulating fluid flow and propagation of acoustic waves in the first volumetric fluid region, (i) pressure losses, and (ii) acoustical losses of the at least one porous medium modeled in the first volumetric fluid region;

simulating, in the simulation space, fluid flow and propagation of acoustic waves in a second volumetric fluid region adjoining the first volumetric fluid region in the simulation space, the activity in the second volumetric fluid region being simulated so as to model movement of elements within the second volumetric fluid region and using a second model having a second set of parameters that comprises a parameter for the second momentum sink; and modeling, based on the simulations fluid flow and propagation of acoustic waves in (i) the first volumetric fluid region, (ii) the second volumetric fluid region, and (iii) between the first and second volumetric fluid regions in the simulation space to model fluid flow and propagation of acoustic waves in the system.

37. The computer-readable data storage medium of claim 36, further comprising storing, in a computer-accessible memory, a first set of state vectors for voxels of the first volumetric fluid region and a second set of state vectors for voxels of the second volumetric fluid region, wherein each of the state vectors comprises a plurality of entries that correspond to particular momentum states of possible momentum states at a corresponding voxel, wherein:

simulating fluid flow and propagation of acoustic waves in the first volumetric fluid region comprises:
performing first interaction operations on the first set of state vectors, the first interaction operations modeling flow and interactions between elements of different momentum states according to the first model, and
performing first move operations on the first set of state vectors to reflect movement of elements to new voxels in the first volumetric fluid region according to the first model; and simulating fluid flow and propagation of acoustic waves in the second volumetric fluid region comprises:
performing second interaction operations on the second set of state vectors, the second interaction operations modeling flow and interactions between elements of different momentum states according to the second model, and
performing second move operations on the second set of state vectors to reflect movement of elements to new voxels in the second volumetric fluid region according to the second model.

38. The computer-readable data storage medium of claim 36, wherein the elements comprise particle distributions.

39. The computer-readable data storage medium of claim 36, wherein the elements comprise one or more of mass, density, momentum, pressure, velocity, temperature, energy, mass fluxes, momentum fluxes, and energy fluxes within the fluid.

40. The computer-readable data storage medium of claim 36, wherein simulating movement of elements between the first volumetric fluid region and the second volumetric fluid region at an interface between the first volumetric fluid region and the second volumetric fluid region comprises simulating movement of elements between a region of the first volumetric fluid region at the interface and a region of the second volumetric fluid region at the interface, and wherein movement of elements from the first volumetric fluid region to the second volumetric fluid region is governed by a first set of constraints and movement of elements from the second volumetric fluid region to the first volumetric fluid region is governed by a second set of constraints that differs from the first set of constraints.

41. The computer-readable data storage medium of claim 40, wherein the first set of constraints permits a fraction of elements oriented to move from the first volumetric fluid region to the second volumetric fluid region to actually move from the first volumetric fluid region to the second volumetric fluid region, the fraction corresponding to a porosity of the at least one porous medium being simulated.

42. The computer-readable data storage medium of claim 40, wherein the second set of constraints permits all elements oriented to move from the second volumetric fluid region to the first volumetric fluid region to actually move from the second volumetric fluid region to the first volumetric fluid region.

43. The computer-readable data storage medium of claim 36, wherein the first set of parameters of the first model differs from the second set of parameters of the second model in a way that accounts for one or more of acoustic resistance, acoustic absorption, and acoustic impedance of the at least one porous medium being simulated.

44. The computer-readable data storage medium of claim 36, wherein the first set of parameters of the first model differs from the second set of parameters of the second model in a way that accounts for one or more of tortuosity, characteristic viscous length, thermal characteristic length, and thermal permeability of the at least one porous medium being simulated.

45. The method of claim 1, wherein simultaneously simulating flow and acoustic behavior of the fluid in the system further comprises simulating fluid flow and propagation of acoustic waves in a third volumetric fluid region occupied by a porous medium adjoining the first volumetric fluid region, the porous medium of the third volumetric fluid region having a different porosity than the porosity of the at least one porous medium of the first volumetric fluid region, the activity in the third volumetric fluid region being simulated so as to model movement of elements within the third volumetric fluid region and using a third model having a third set of parameters and differing from the first and second models in a way that accounts for flow and acoustic properties of the porous medium of the third volumetric fluid region, the third set of parameters comprising at least one parameter associated with flow resistance and acoustic absorption for the porous medium of the third volumetric fluid region that differs from at least one parameter associated with flow resistance and acoustic absorption for the at least one porous medium of the first volumetric fluid region.

* * * * *

UNITED STATES PATENT AND TRADEMARK OFFICE
CERTIFICATE OF CORRECTION

PATENT NO. : 9,037,440 B2  
APPLICATION NO. : 13/292844  
DATED : May 19, 2015  
INVENTOR(S) : Chenghai Sun et al.

Page 1 of 1

It is certified that error appears in the above-identified patent and that said Letters Patent is hereby corrected as shown below:

Title page, Col. 2, (Abstract), delete "second" and insert -- second volume --, therefor.

In the Claims

Col. 27, line 52, Claim 2, after "second" delete "first".

Signed and Sealed this
Twenty-ninth Day of September, 2015

Michelle K. Lee
*Director of the United States Patent and Trademark Office*